(12) United States Patent
Dunigan

(10) Patent No.: US 11,365,103 B2
(45) Date of Patent: Jun. 21, 2022

(54) MODULAR FORK ASSEMBLY FOR A MATERIAL-HANDLING VEHICLE

(71) Applicant: Hyster-Yale Group, Inc., Fairview, OR (US)

(72) Inventor: Robert Dunigan, Benson, NC (US)

(73) Assignee: Hyster-Yale Group, Inc., Fairview, OR (US)

( * ) Notice: Subject to any disclaimer, the term of this patent is extended or adjusted under 35 U.S.C. 154(b) by 171 days.

(21) Appl. No.: 16/367,050

(22) Filed: Mar. 27, 2019

(65) Prior Publication Data

US 2020/0307975 A1 Oct. 1, 2020

(51) Int. Cl.
*B66F 9/12* (2006.01)

(52) U.S. Cl.
CPC ..................... *B66F 9/12* (2013.01)

(58) Field of Classification Search
CPC . B62B 2205/30; B62B 2205/006; B62B 3/06; B62B 3/0612; B62B 3/0618; B66F 9/12
See application file for complete search history.

(56) References Cited

U.S. PATENT DOCUMENTS

| | | | |
|---|---|---|---|
| 2,575,552 A | 11/1951 | Glenn | |
| 3,188,106 A | 6/1965 | Ulinski | |
| 3,287,024 A | 11/1966 | Ulinski | |
| 3,850,322 A | 11/1974 | Miles et al. | |
| 4,290,729 A | 9/1981 | Cary | |
| 4,969,794 A * | 11/1990 | Larsen | B62B 3/0618 |
| | | | 280/43.12 |
| 5,190,435 A * | 3/1993 | Epstein | B66F 9/07545 |
| | | | 187/222 |
| 6,079,941 A | 6/2000 | Lee | |
| 6,139,248 A | 10/2000 | Bentgen et al. | |
| 6,730,861 B1 | 5/2004 | Simons | |
| 7,731,206 B2 | 6/2010 | Borrmann | |
| 8,919,472 B2 | 12/2014 | Magens et al. | |
| 9,738,501 B2 | 8/2017 | Wendt et al. | |
| 2007/0152412 A1 | 7/2007 | Chaseateau | |
| 2009/0279994 A1 | 11/2009 | Gramatikov | |
| 2014/0070506 A1* | 3/2014 | Sammons | B62B 3/02 |
| | | | 280/79.11 |
| 2018/0065653 A1 | 3/2018 | Rusche et al. | |

FOREIGN PATENT DOCUMENTS

| | | |
|---|---|---|
| CN | 107298409 A | 10/2017 |
| CN | 207330263 U | 5/2018 |
| FR | 1381775 A | 12/1964 |
| JP | 2004284744 A | 10/2004 |
| WO | 33068659 A1 | 8/2003 |

OTHER PUBLICATIONS

European Search Report, for Appl. No. 19 16 8663; dated Dec. 20, 2019.

* cited by examiner

*Primary Examiner* — Saul Rodriguez
*Assistant Examiner* — Willie Berry, Jr.
(74) *Attorney, Agent, or Firm* — Laurence & Phillips IP Law

(57) ABSTRACT

A modular fork assembly for a pallet truck includes a discrete elongate body, a discrete load wheel module, and a discrete fork tip that may be detachably connected by the same or different types of interlocking mechanisms that are adapted to inhibit sheer forces. The load wheel module includes a frame and a load wheel assembly that includes a load wheel that is operatively connected to the frame.

63 Claims, 12 Drawing Sheets

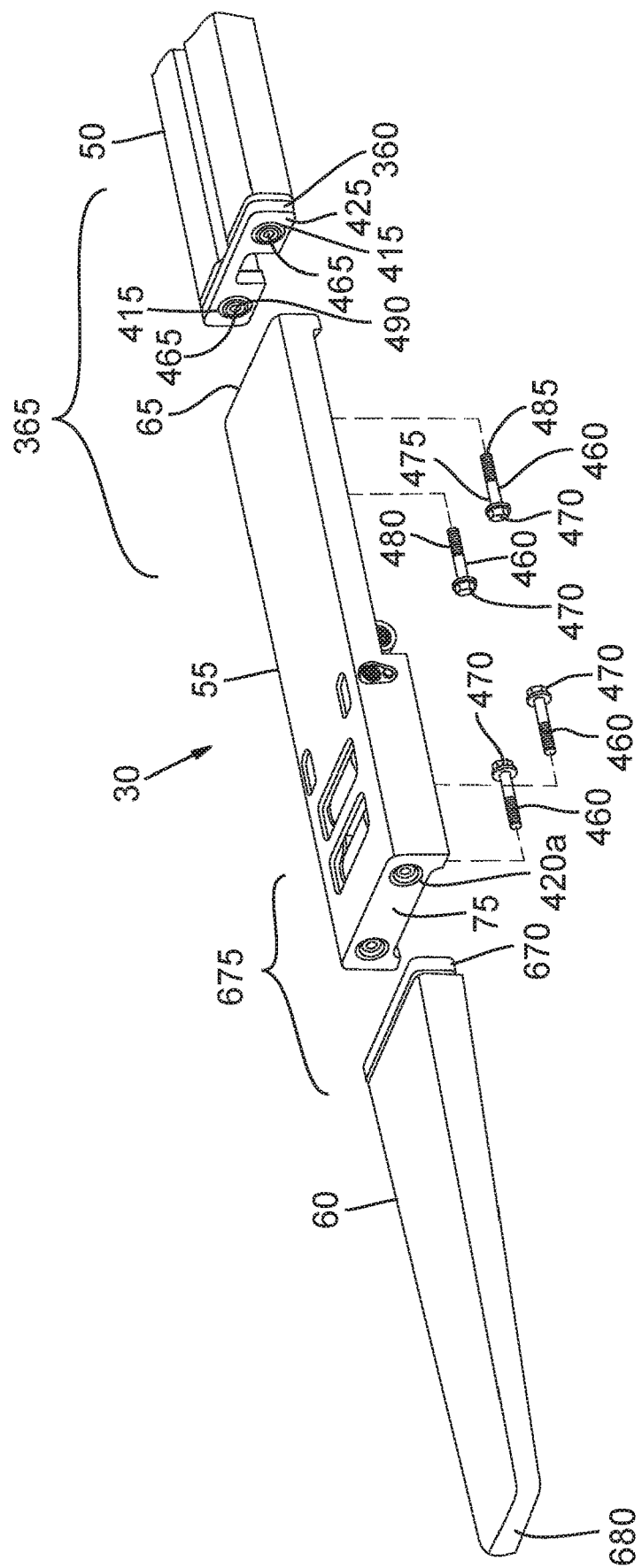

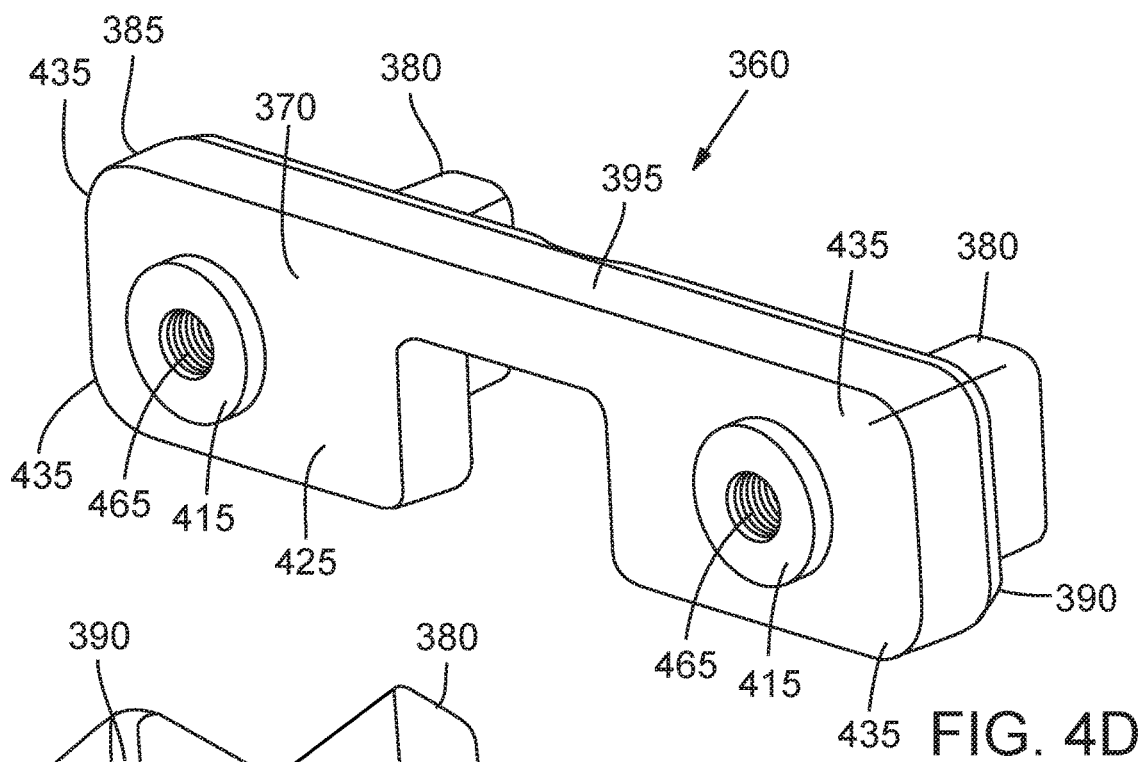
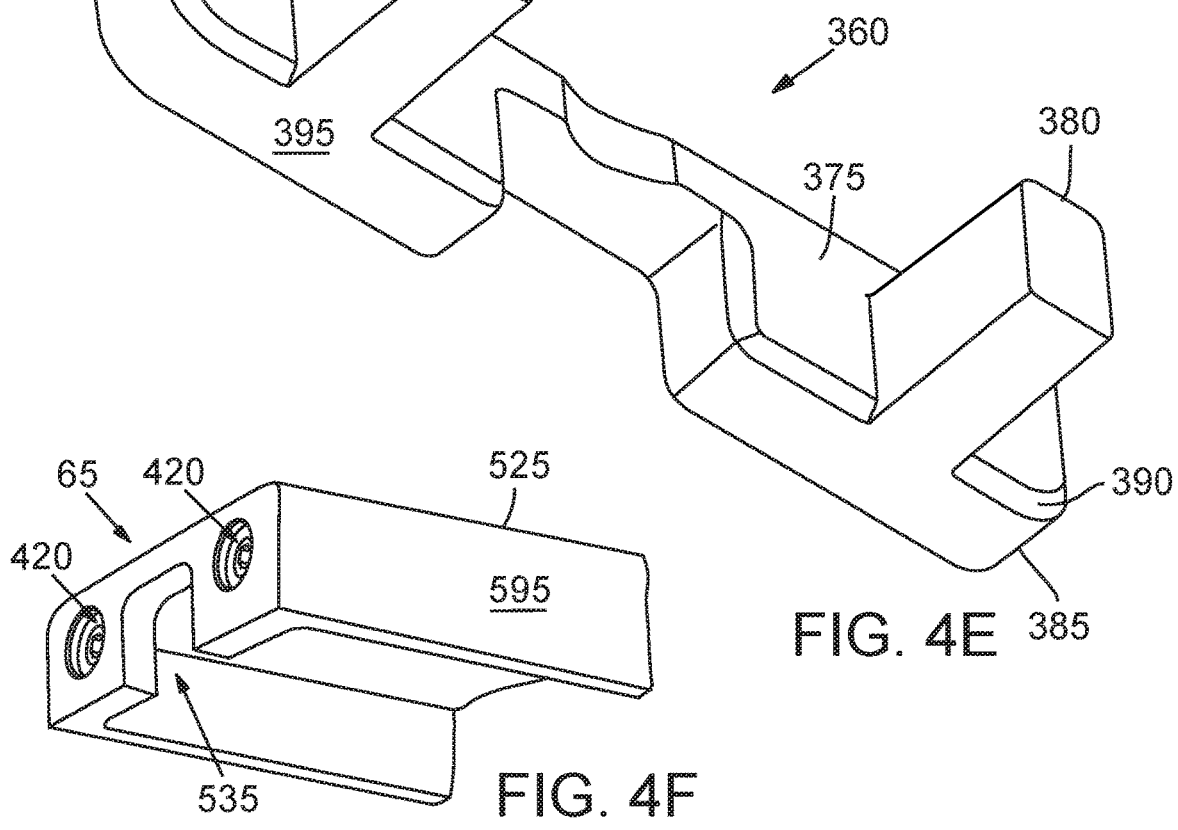

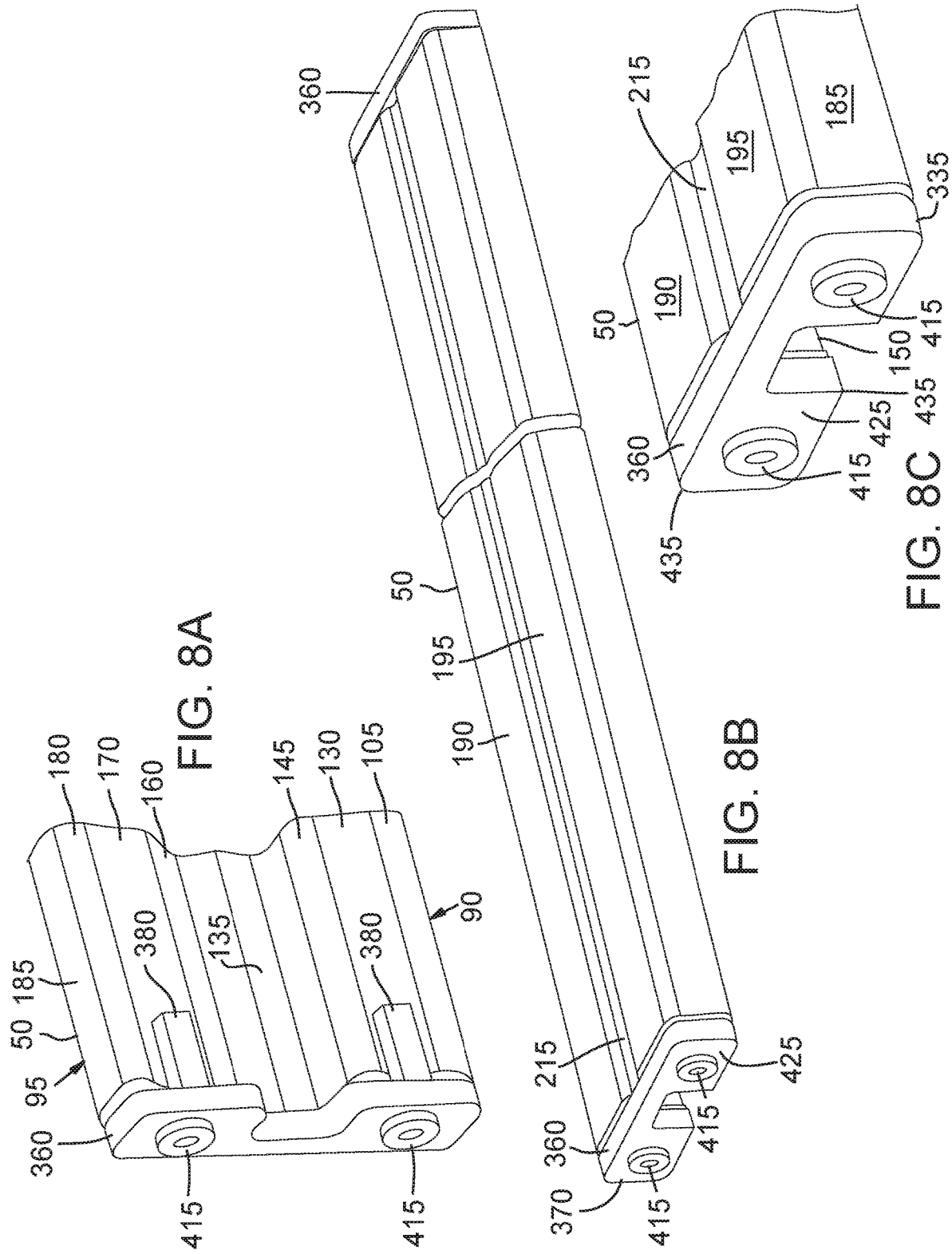

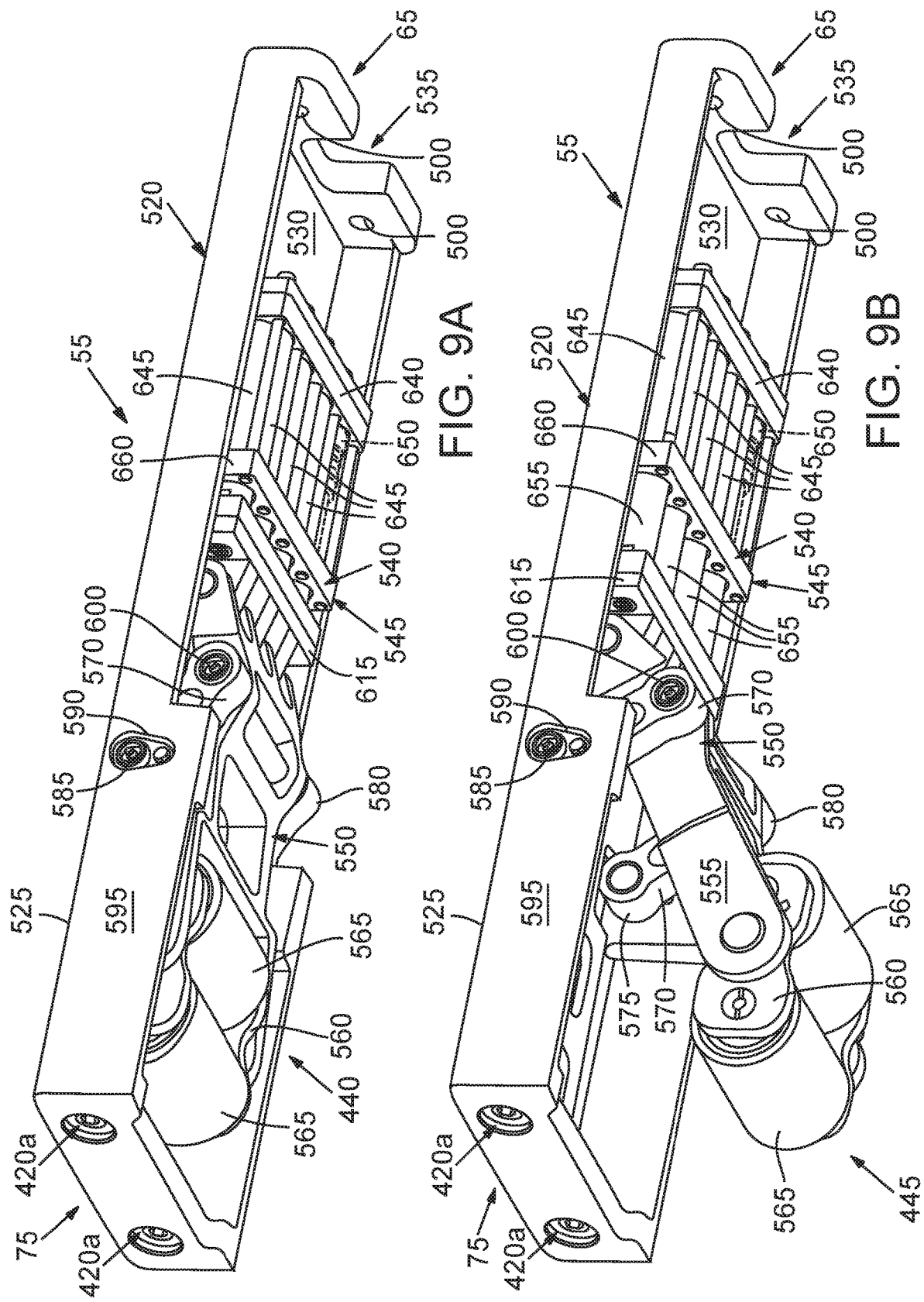

MODULAR FORK ASSEMBLY FOR A MATERIAL-HANDLING VEHICLE

TECHNICAL FIELD

The field of this disclosure relates generally to forked vehicles configured to transport goods and materials. More specifically, this disclosure relates to fork assemblies for pallet trucks.

BACKGROUND INFORMATION

Material-handling vehicles, such as forked vehicles, are presented herein only by way of example to pallet trucks. Typical pallet trucks support one, two in-line, or three in-line standard size pallets. Typically, pallet trucks include lifting load forks that are welded at their rear end or heel end to a chassis or battery box. The forks typically include an elongate body welded to elongate steel tubes to provide support. The front end of the forks typically includes support rollers. A hydraulic system, which is located in proximity to the chassis or battery box, operates a lifting mechanism that moves the support rollers, and lifts the chassis or battery box and the forks together with goods, such as pallets loaded thereon. The support rollers are typically coupled to the lift mechanism by a mechanical linkage that transmits force from a hydraulic lifting cylinder to the support rollers. A valve arrangement is provided to relieve the hydraulic pressure in the lifting cylinder, thus lowering and placing the load on the floor. Steer wheels are located behind the battery box. A steering mechanism, such as a tiller, also may be provided to steer the steer wheels relative to the chassis and forks.

OVERVIEW OF DISCLOSURE

This overview is provided to introduce a selection of concepts in a simplified form that are further described in greater detail later. This overview is not intended to identify key or essential inventive concepts of the claimed subject matter, nor is it intended for limiting the scope of the claimed subject matter.

One aspect of this disclosure relates to fork assemblies that include modular detachable components.

Another aspect of this disclosure relates to load wheel modules that contain a hydraulic actuator.

In one embodiment, a fork assembly for a forked material-handling truck (e.g., pallet truck) comprises a discrete elongate body; a discrete load wheel module; a first interlocking mechanism configured for detachable connection of the elongate body to the load wheel module; a discrete fork tip; and a second interlocking mechanism configured for detachable connection of the load wheel module to the fork tip.

In some additional, alternative, or selectively cumulative embodiments, a load wheel module for a fork assembly for a forked material-handling truck (e.g., pallet truck) comprises a frame; a load wheel assembly, including a load wheel, operatively connected to the frame; and a hydraulic actuator contained within the frame and operatively connected to the load wheel assembly to lower the load wheel hydraulically.

In some additional, alternative, or selectively cumulative embodiments, an inventory of parts for a fork assembly for a forked material-handling truck (e.g., pallet truck) comprises multiple interchangeable elongate bodies; multiple interchangeable load wheel modules; multiple interchangeable fork tips; and multiple operatively identical interlocking mechanism components configured for detachable connection of any one of the elongate bodies to any one of the load wheel modules and configured for detachable connection of any one of the fork tips to any one of the load wheel modules.

In some additional, alternative, or selectively cumulative embodiments, a forked material-handling truck (e.g., pallet truck) including a fork assembly comprises a steer wheel; a chassis operatively connected to the steer wheel; and two substantially parallel forks operatively connected to and extending from the chassis and configured to hold a load for conveyance by the pallet truck as the pallet truck moves, the forks including a first fork and a second fork, wherein the first fork comprises a first elongate body, a first load wheel module, a first interlocking mechanism configured for detachable connection of the first elongate body to the first load wheel module, a first fork tip, and a second interlocking mechanism configured for detachable connection of the first load wheel module to the first fork tip, wherein the second fork comprises a second elongate body, a second load wheel module, a third interlocking mechanism configured for detachable connection of the second elongate body to the second load wheel module, a second fork tip, and a fourth interlocking mechanism configured for detachable connection of the second load wheel module to the second fork tip.

In some additional, alternative, or selectively cumulative embodiments, a method for deploying a load wheel of a forked material-handling truck (e.g., pallet truck) in response to a load wheel deployment signal comprises providing hydraulic power through a hydraulic line positioned within an elongate body of a fork assembly; employing the hydraulic power from the hydraulic line to actuate multiple pistons of an actuator positioned within a load wheel module of the fork assembly, wherein the load wheel module has a load wheel module frame that is operatively connected to the elongate body; and employing the multiple pistons to deploy the load wheel so that it is vertically spaced apart from the load wheel module frame.

In some additional, alternative, or selectively cumulative embodiments, a method of assembling a fork for a forked material-handling vehicle comprises detachably connecting a modular elongate body to a modular load wheel module; and detachably connecting the modular load wheel module to a modular fork tip.

In some additional, alternative, or selectively cumulative embodiments, a fork for a forked material-handling vehicle comprises a frame; a wheel operatively connected to the frame; and a hydraulic actuator contained within the frame and operatively connected to the wheel to lower the wheel hydraulically, the hydraulic actuator having an input for connection to a hydraulic hose running along a portion of the length of the fork from a hydraulic pressure source.

In some additional, alternative, or selectively cumulative embodiments, the first interlocking mechanism and the second interlocking mechanism are substantially identical.

In some additional, alternative, or selectively cumulative embodiments, the first interlocking mechanism and the second interlocking mechanism contain a substantially identical component.

In some additional, alternative, or selectively cumulative embodiments, the first interlocking mechanism and the second interlocking mechanism are operatively identical.

In some additional, alternative, or selectively cumulative embodiments, the first interlocking mechanism and the second interlocking mechanism are interchangeable.

In some additional, alternative, or selectively cumulative embodiments, the first interlocking mechanism and the second interlocking mechanism contain an interchangeable component.

In some additional, alternative, or selectively cumulative embodiments, the first and second load wheel modules are interchangeable, the first and second tips are interchangeable, the first and third interlocking mechanisms are operatively identical, and the second and fourth interlocking mechanisms are operatively identical.

In some additional, alternative, or selectively cumulative embodiments, the first interlocking mechanism and the second interlocking mechanism contain a reusable component.

In some additional, alternative, or selectively cumulative embodiments, at least one of the first interlocking mechanism and the second interlocking mechanism employs one or more mated pairs of internally threaded receptacles and externally threaded fasteners.

In some additional, alternative, or selectively cumulative embodiments, the externally threaded fasteners have a minimum diameter of about 12 mm.

In some additional, alternative, or selectively cumulative embodiments, at least one of the first interlocking mechanism and the second interlocking mechanism employs mated shear-resistant features, including first and second sheer-resistant features.

In some additional, alternative, or selectively cumulative embodiments, the first sheer-resistant feature includes a protruding feature and the second sheer-resistant feature includes a receiving feature.

In some additional, alternative, or selectively cumulative embodiments, the first interlocking mechanism includes a first protruding feature that is mated to a first receiving feature, wherein one of the first protruding feature and the first receiving feature is permanently connected to or associated with the elongate body, wherein a different one of the first protruding feature and the first receiving feature is permanently connected to or associate with the load wheel module.

In some additional, alternative, or selectively cumulative embodiments, the sheer-resistant features are configured to receive a fastener.

In some additional, alternative, or selectively cumulative embodiments, the first interlocking mechanism employs a first internally threaded receptacle that is mated to a first externally threaded fastener, wherein one of the first internally threaded receptacle and first externally threaded fastener is configured to connect to the elongate body, and wherein a different one of the first internally threaded receptacle and the first externally threaded fastener is configured to connect to the load wheel module.

In some additional, alternative, or selectively cumulative embodiments, both of the first protruding feature and the first receiving feature are configured to receive the first externally threaded fastener.

In some additional, alternative, or selectively cumulative embodiments, the first interlocking mechanism includes a first endcap that is attached to the elongate body and includes a first sheer-resistant body feature that is mated to a first sheer-resistant module feature of the load wheel module.

In some additional, alternative, or selectively cumulative embodiments, the first sheer-resistant body feature and the first sheer-resistant module feature are adapted to receive a fastener.

In some additional, alternative, or selectively cumulative embodiments, the first endcap is welded to the elongate body.

In some additional, alternative, or selectively cumulative embodiments, the second interlocking mechanism includes a second endcap that is attached to the fork tip and includes a second sheer-resistant attachment feature that is mated to a second sheer-resistant module feature of the load wheel module, wherein the first and second interlocking mechanisms are operatively identical.

In some additional, alternative, or selectively cumulative embodiments, the second interlocking mechanism includes a second endcap that is attached to the fork tip and includes a second sheer-resistant attachment feature that is mated to a second sheer-resistant module feature of the load wheel module.

In some additional, alternative, or selectively cumulative embodiments, the second sheer-resistant attachment feature and the second sheer-resistant module feature are adapted to receive a fastener.

In some additional, alternative, or selectively cumulative embodiments, the elongate body has a first characterizing color, wherein the load wheel module has a second characterizing color, wherein the fork tip has a third characterizing color, and wherein the first, second, and third characterizing colors are different.

In some additional, alternative, or selectively cumulative embodiments, the load wheel module has opposing ends having substantially identical sheer-resistant features.

In some additional, alternative, or selectively cumulative embodiments, the elongate body includes a channel along its length, and wherein an endcap associated with the first interlocking mechanism includes an aperture that aligns with the channel.

In some additional, alternative, or selectively cumulative embodiments, the fork tip includes a proximal connection end for attachment closest to the load wheel module, wherein the proximal end has proximal end dimensions, wherein the fork tip includes a distal end that has distal end dimensions, and wherein at least one of the distal end dimensions is smaller than a respective one of the proximal end dimensions.

In some additional, alternative, or selectively cumulative embodiments, the pallet truck comprises: a hydraulic power source; and a first hydraulic line positioned through the first elongate body, wherein the first hydraulic line transmits hydraulic fluid from the hydraulic power source to a first hydraulic actuator positioned within the first load wheel module.

In some additional, alternative, or selectively cumulative embodiments, the load wheel module comprises: a frame; a load wheel assembly, including a load wheel, operatively connected to the frame; and a hydraulic actuator contained within the frame and operatively connected to the load wheel assembly to lower the load wheel hydraulically.

In some additional, alternative, or selectively cumulative embodiments, the load wheel module comprises a frame; a load wheel assembly, including a load wheel, operatively connected to the frame; and a mechanical link operatively coupled to the load wheel assembly to lower the load wheel, wherein the mechanical link extends through the discrete elongate body.

In some additional, alternative, or selectively cumulative embodiments, the pallet truck comprises a power source and a first mechanical link positioned through the first elongate body, wherein the first mechanical link transmits force from the power source to a first load wheel mechanism positioned within the first load wheel module.

In some additional, alternative, or selectively cumulative embodiments, the pallet truck comprises: first and second elongate bodies having a first characterizing color, first and second load wheel modules having a second characterizing color, first and second fork tips having a third characterizing color, wherein the first, second, and third characterizing colors are different.

In some additional, alternative, or selectively cumulative embodiments, the hydraulic actuator includes a hydraulic line input connector operative for connecting the hydraulic actuator to a hydraulic line that transmits hydraulic fluid from a hydraulic power source.

In some additional, alternative, or selectively cumulative embodiments, hydraulic power from the hydraulic power source has a maximum pressure within the range of about 2,000 to about 4,000 psi at the hydraulic line input connector.

In some additional, alternative, or selectively cumulative embodiments, the hydraulic actuator includes multiple pistons.

In some additional, alternative, or selectively cumulative embodiments, the multiple pistons are hydraulically connected to a hydraulic manifold.

In some additional, alternative, or selectively cumulative embodiments, the hydraulic manifold is hydraulically connected to a hydraulic line input connector operative for connecting the hydraulic actuator to a hydraulic line that transmits hydraulic fluid from a hydraulic power source.

In some additional, alternative, or selectively cumulative embodiments, at least one of the pistons has a length within the range of about 0.50 inches to about 3 inches (about 1.27 to about 7.62 cm) and a stroke length within the range of about 1 to about 3 inches (about 2.54 to about 7.62 cm).

In some additional, alternative, or selectively cumulative embodiments, at least one of the pistons has a length within the range of about 1 to about 2 inches (about 2.54 to about 5.08 cm) and a stroke length within the range of about 1.5 to about 2.5 inches (about 3.81 to about 6.35 cm).

In some additional, alternative, or selectively cumulative embodiments, the hydraulic actuator includes at least three pistons.

In some additional, alternative, or selectively cumulative embodiments, the hydraulic actuator includes at least four pistons.

In some additional, alternative, or selectively cumulative embodiments, the hydraulic actuator is operable to provide maximum thrust within a range of about 66,723 newtons (about 15,000 pounds) to about 133,446 newtons (about 30,000 pounds).

In some additional, alternative, or selectively cumulative embodiments, the hydraulic actuator is operable to provide greater than about 66,723 newtons (about 15,000 pounds) of thrust.

In some additional, alternative, or selectively cumulative embodiments, the hydraulic actuator is operable to provide greater than about 88,964 newtons (about 20,000 pounds) of thrust.

In some additional, alternative, or selectively cumulative embodiments, the hydraulic actuator is operatively connected to the load wheel module frame.

In some additional, alternative, or selectively cumulative embodiments, the frame includes a fork tip-facing end and a body-facing end, and wherein the actuator is positioned closer to the body-facing end than to the fork tip-facing end.

In some additional, alternative, or selectively cumulative embodiments, the body-facing end includes an aperture adapted to accommodate a hydraulic line that transmits hydraulic fluid from a hydraulic power source to the hydraulic actuator.

In some additional, alternative, or selectively cumulative embodiments, the load wheel module comprises: a first attachment feature of a first interlocking mechanism configured for detachable connection of the body-facing end of the frame to an elongate body; and a second attachment feature of a second interlocking mechanism configured for detachable connection of the fork tip-facing end of the frame to a fork tip.

In some additional, alternative, or selectively cumulative embodiments, at least one of the first and second attachment features includes a sheer-resistant module feature that is mated to a sheer-resistant feature of the elongate body or the fork tip.

In some additional, alternative, or selectively cumulative embodiments, the sheer-resistant module feature includes one or more receiving features.

In some additional, alternative, or selectively cumulative embodiments, the load wheel module frame includes a fork tip-facing end and a body-facing end, wherein the load wheel is positioned closer to the fork tip-facing end than to the body-facing end.

In some additional, alternative, or selectively cumulative embodiments, the load wheel is one of multiple load wheels that are part of the load wheel module.

In some additional, alternative, or selectively cumulative embodiments, the hydraulic actuator and the load wheel assembly form a wheel module substructure, wherein the load wheel assembly includes a load wheel unit and a wheel carrier strut that are operatively connected to each other, and wherein the wheel carrier strut is operatively connected to hydraulic actuator and the frame.

In some additional, alternative, or selectively cumulative embodiments, the wheel carrier strut is pivotally connected to hydraulic actuator and pivotally connected to the frame, and wherein the wheel carrier strut is pivotally connected to the load wheel unit.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 4A illustrates a front right partly exploded isometric view of a portion of the fork assembly shown in FIG. 3A.

FIG. 4D illustrates a front right isometric view of an embodiment of an endcap.

FIG. 4E illustrates a bottom rear right isometric view of an embodiment of an endcap.

FIG. 4F illustrates a rear left bottom isometric view of a body-facing end of a load wheel module, according to one embodiment.

FIG. 8A illustrates a front right bottom isometric view of a portion of an elongate body showing an endcap, according to one embodiment.

FIG. 8B illustrates a top front right isometric view of an elongate body of a fork assembly, wherein the elongate body is attached to endcaps, according to one embodiment.

FIG. 8C illustrates a top front right enlarged isometric view of a portion of an elongate body showing an endcap, according to one embodiment.

FIG. 9A illustrates a front right bottom isometric view of a load wheel module of a fork assembly, showing an undeployed load wheel unit, according to one embodiment.

FIG. 9B illustrates a front right bottom isometric view of a load wheel module of a fork assembly, showing a deployed load wheel unit, according to one embodiment.

DETAILED DESCRIPTION OF EMBODIMENTS

Figure 1A:
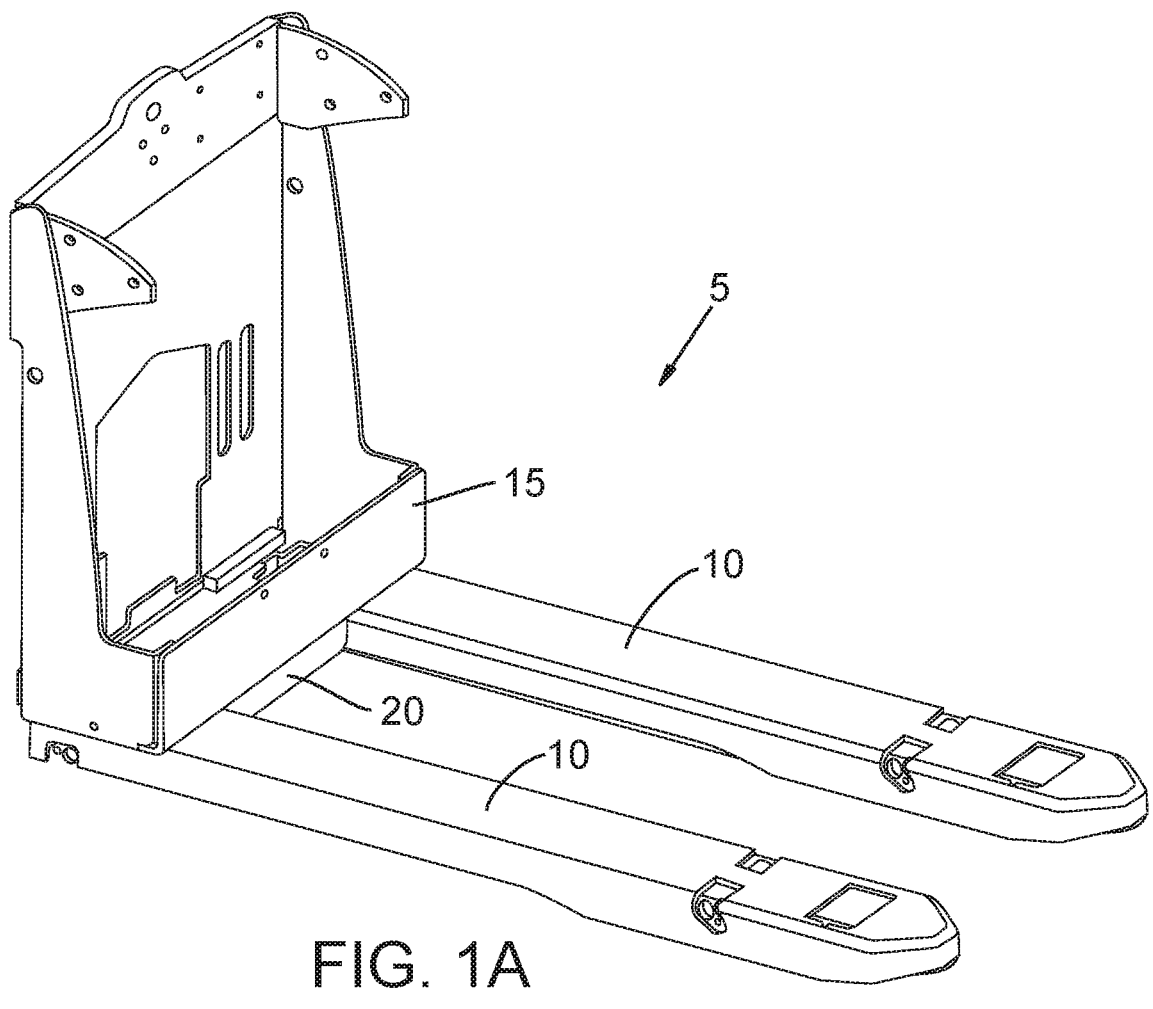
FIG. 1A illustrates a front left isometric view of a prior-art lift fork assembly, showing a pair of forks welded to a battery box.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Figure 1B:
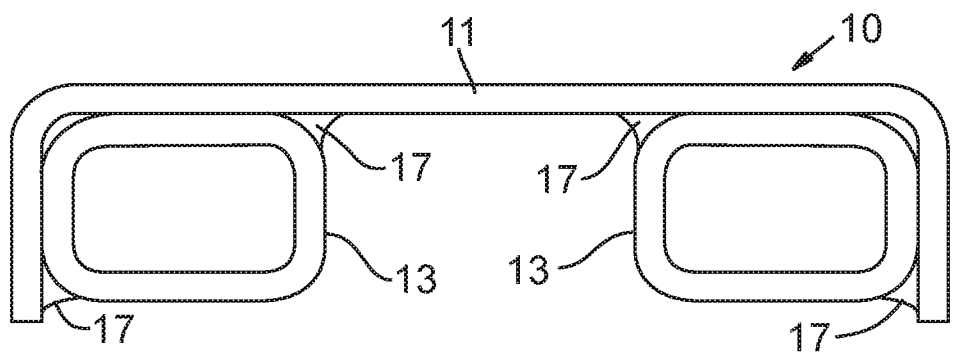
FIG. 1B illustrates a cross-sectional view of a prior-art elongate body of a lift fork.

FIG. 1A illustrates a front left isometric view of a prior-art fork and battery box assembly 5 having a pair of forks 10 welded to a battery box 15, and FIG. 1B illustrates a cross-sectional view of a prior art elongate body of a lift fork 10. As is typical with conventional pallet trucks, each of the forks 10 is made of multiple components (such as a load-bearing surface 11 and support tubes 13) connected by longitudinal welds 17 to form a unitary structure that is welded to the battery box 15 and to a torsion member 20.

One challenge faced by pallet truck manufacturers is that customers often want varying fork configurations, such as forks with variable spreads, lengths, tips, and widths. Because forks are typically manufactured in standard sizes, changing fork parameters requires costly and time-consuming retooling to modify the battery box and/or fork design to produce a pallet truck conforming to individual customer specifications. In some situations, such redesigns can add up to six weeks of lead-time. In addition, stocking multiple lengths of forks may require a significant capital outlay for inventory. Some of these issues can be addressed by the development of a modular fork assembly with detachably connectable components that couples directly or indirectly to the battery box, chassis, or other part connected to the chassis.

Figure 2:
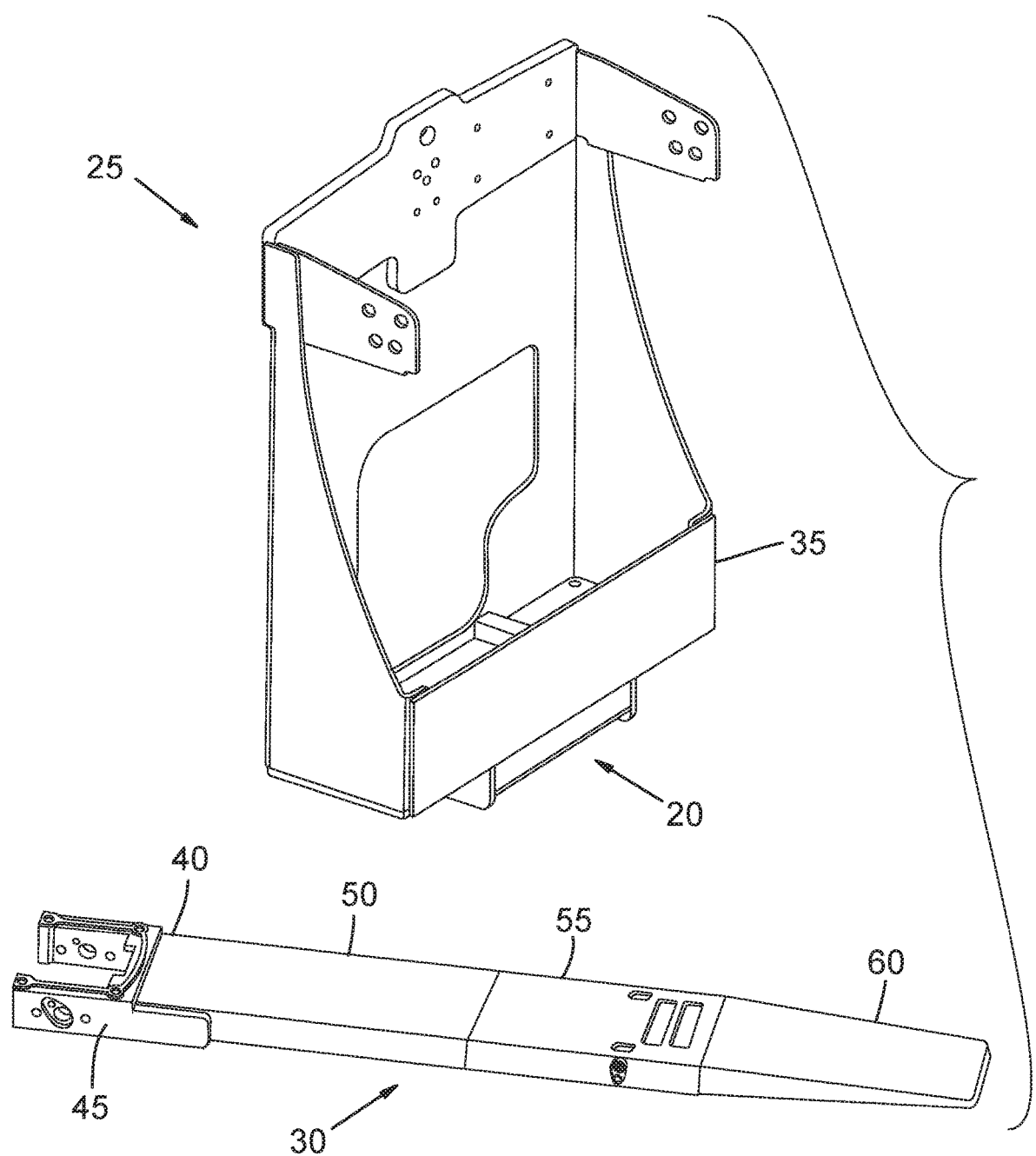
FIG. 2 illustrates a front left partly exploded isometric view of an example battery box and a fork assembly showing the fork assembly disassembled from the battery box, according one embodiment.

FIG. 2 illustrates a front left isometric view of an example of a fork and battery box assembly 25 with a modular fork assembly 30 disassembled from a battery box 35 of a pallet truck, such as one of the HYSTER W45ZHD2 or YALE MPB045ZH manufactured by the Hyster-Yale Group, 5200 Martin Luther King Junior Highway, Greenville, N.C. 27834. A typical fork and battery box assembly 25 includes one battery box 35 and multiple modular fork assemblies 30 (such as two modular fork assemblies 30), though only one modular fork assembly 30 is depicted in FIG. 2. The modular fork assemblies 30 may be coupled to the battery box 35 by welding or by locking. Locking a modular fork assembly 30 to the battery box 35, the torsion member 20, or both, means that the modular fork assembly 30 can also be unlocked from the battery box 35, the torsion member 20, or both.

The modular fork assembly 30 may be coupled to the battery box 35 through one or more intermediary couplers or interlocking mechanisms, such as an optional heel 45 shown in FIG. 2. The optional heel 45 can be connected to the elongate body 50, for example, by welding or other suitable attachment, such as later described. A proximal end 40 (also referred to as a heel end) of the elongate body 50 is the end closest to the battery box 35. As illustrated, the proximal end 40 of the modular fork assembly 30 is coupled to the heel 45, which is configured to be locked to the battery box 35 and/or the torsion member 20; however, the proximal end 40 of the modular fork assembly 30 may be welded or otherwise coupled directly to the battery box 35 and/or the torsion member 20 with or without employing a separate optional heel 45.

The battery box 35 is sized to fit a battery or battery array. When used in conjunction with a pallet truck, pallet jack, or other suitable forklift, the entire fork and battery box assembly 25 may be raised and lowered as a single unit, for example via a hydraulic cylinder actuated by hydraulic power from a hydraulic power source (not shown). The two modular fork assemblies 30 may be referred to as a right modular fork assembly and a left modular fork assembly, depending on the side of the battery box 35 to which they are coupled. These right and left modular fork assemblies may be identical such that one modular fork assembly may be swapped for the other.

Figure 3A:
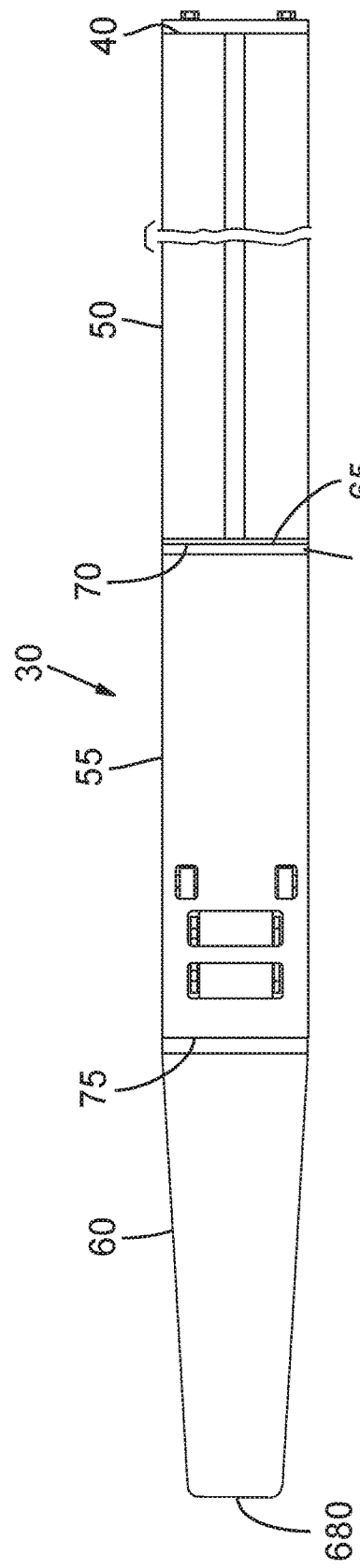
FIG. 3A illustrates a top plan view of a fork assembly, according one embodiment.
Figure 3B:
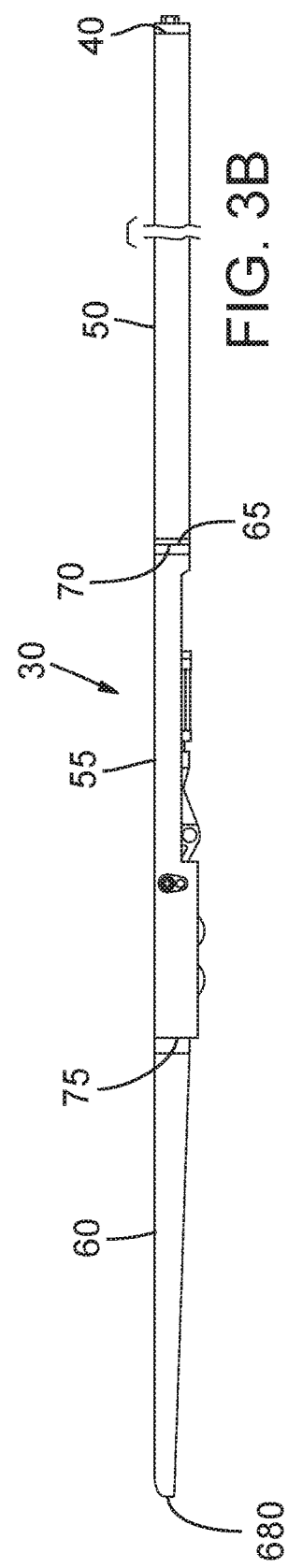
FIG. 3B illustrates a right-side elevation view of the fork assembly shown in FIG. 3A.
Figure 3C:
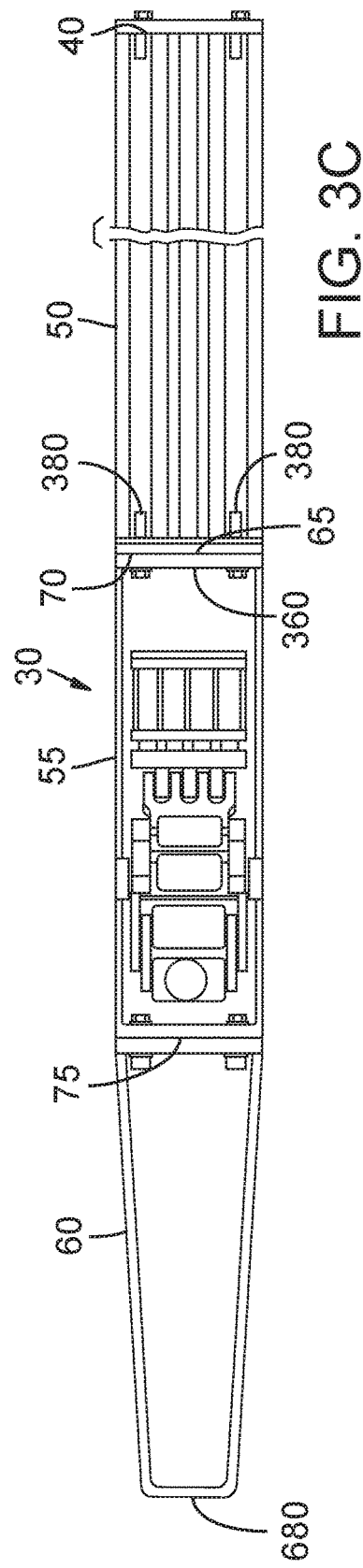
FIG. 3C illustrates a bottom view of the fork assembly shown in FIG. 3A.
Figure 3D:
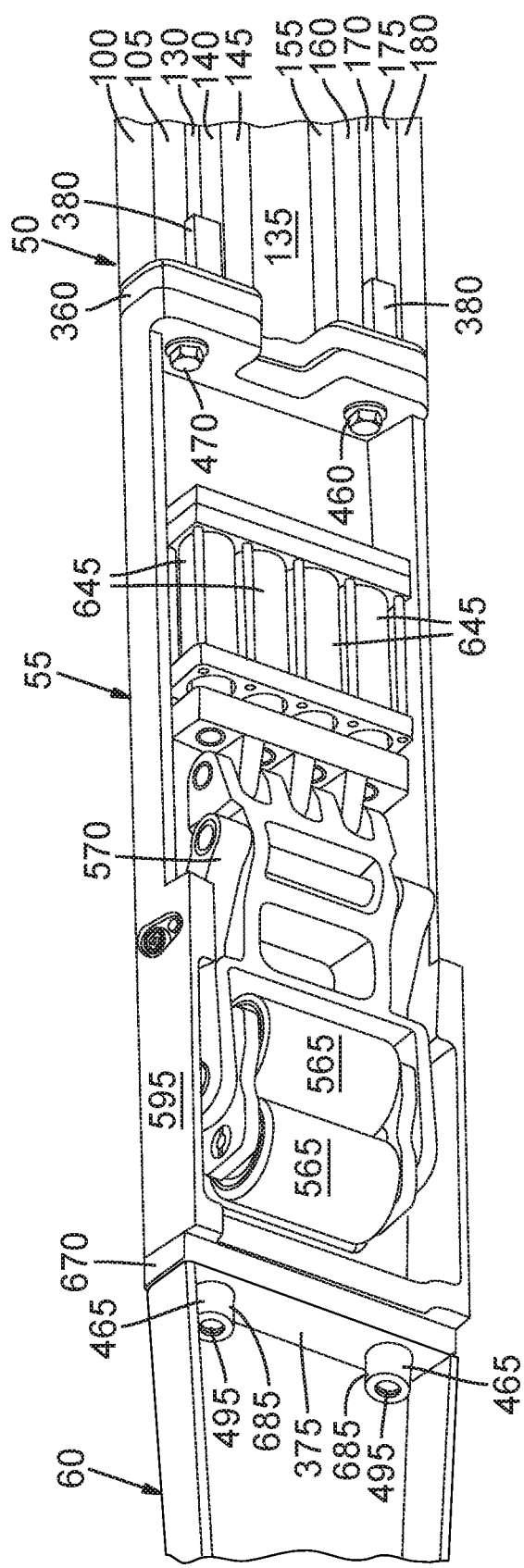
FIG. 3D illustrates a bottom right isometric view of a portion of the fork assembly, showing components of an embodiment of a first interlocking mechanism.
Figure 4B:
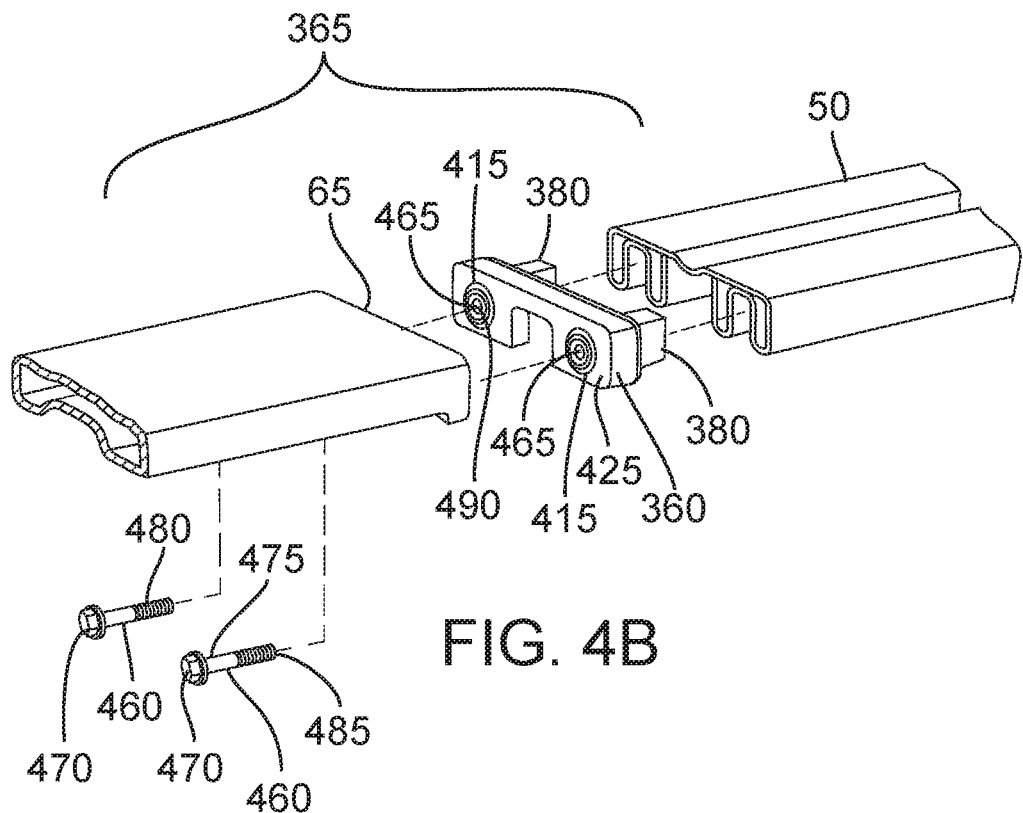
FIG. 4B illustrates a front right exploded isometric view of a portion of the fork assembly, showing components of an embodiment of a first interlocking mechanism.
Figure 4C:
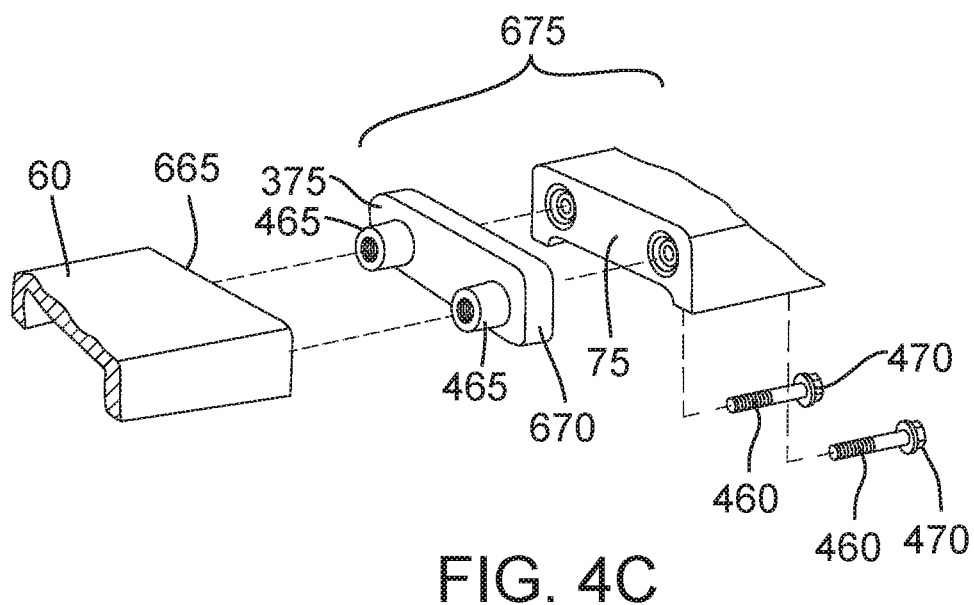
FIG. 4C illustrates a front right exploded isometric view of a portion of the fork assembly, showing components of an embodiment of a second interlocking mechanism.

FIG. 3A, FIG. 3B, and FIG. 3C (collectively FIG. 3) illustrate respective top plan, right side elevation, bottom, and bottom right isometric views of an example of a modular fork assembly 30. FIG. 4A illustrates a front right partly exploded isometric view of a portion of the modular fork assembly 30 shown in FIG. 3A; FIG. 4B illustrates a front right exploded isometric view of a portion of the modular fork assembly 30, showing components of an embodiment of a first interlocking mechanism 365; FIG. 4C illustrates a front right exploded isometric view of a portion of the modular fork assembly, showing components of an embodiment of a second interlocking mechanism 675; FIG. 4D illustrates a front right isometric view of an embodiment of an endcap 360; FIG. 4E illustrates a bottom rear right isometric view of an embodiment of the endcap 360; and FIG. 4F illustrates a rear left bottom isometric view of a body-facing end 65 of the load wheel module 55.

With reference to FIG. 3 and FIGS. 4A, 4B, 4C, 4D, 4E, and 4F (collectively FIG. 4) each modular fork assembly 30 includes multiple components. A fully assembled modular fork assembly 30 includes an elongate body 50, a load wheel module 55, and a fork tip 60 (also referred to as a fork toe). A proximal or body-facing end 65 of the load wheel module 55 can be detachably connected to a distal end 70 (opposite the proximal end 40) of the elongate body 50, the distal end 70 being furthest from the battery box 35. And, the fork tip 60 can be detachably connected to a distal or fork tip-facing end 75 of the load wheel module 55. The elongate body 50, the load wheel module 55, and the fork tip 60 may be randomly selected from an inventory of respective substantially identical elongate bodies 50, load wheel modules 55, and fork tips 60. To facilitate ease of storage and assembly, the elongate bodies 50 may have a first characterizing color; the load wheel modules 55 may have a second characterizing color; and the fork tips 60 may have a third characterizing color, wherein the first, second, and third characterizing colors are different.

For convenience and modularity, the optional heel 45, the elongate body 50, and the fork tip 60 may be identical for both the left and right modular fork assemblies 30 (e.g. the fork assemblies 30 coupled to the left and right sides of the battery box 35). Using identical components for both the left and right fork assemblies 30 increases the modularity of the system over a system in which the left and right forks are made with distinct, non-interchangeable components. However, distinct, non-identical exchangeable components may be used to create different left and right modular fork assemblies 30. For example, the elongate body 50 may be made in any desired length, detachably coupled to one of several different designs for the load wheel module 55, which is in turn detachably coupled to a desired fork tip 60 to create a customizable modular fork assembly 30 to accommodate a wide range of customer preferences.

Although a fork body of conventional cross-sectional construction can be employed, the elongate body 50 can alternatively be formed such that thinner and/or lighter materials may be used compared to existing fork bodies while providing excellent dimensional stability and reducing materials costs and/or weight. In some embodiments, the elongate body 50 may include no more than two longitudinal weldments, or no more than one longitudinal weldment. In some embodiments, the method further includes forming a longitudinal weldment to join the first longitudinal edge and the second longitudinal edge of the steel sheet; and, in particular embodiments, the longitudinal weldment may extend the full length of the elongate body portion.

Additionally, manufacturing processes that avoid the need to separately weld multiple parts together may be used, such as roll forming, additive manufacturing, or extrusion processes. One method of making the elongate body 50 for the modular fork assembly 30 includes using a rolling process to form a steel sheet into the elongate body 50, which may include an understructure 80 and a load-bearing upper structure 85. The rolling process may be a cold rolling process wherein the shape of the understructure is designed to be integrally strong so as to be substantially weldless or employ a few welds out of an abundance of caution. Alternatively a hot or warm rolling process may provide self-melding between components of the elongate body 50 that touch each other. The rolling process can be a continuous process that forms all the components of a cross section of the elongate body 50. Another method includes using an extrusion process to form the elongate body portion 50. The optional use of such processes to form the elongate body 50 reduces the assembly and welding costs typically associated with conventional fork manufacture. These and other features provide a competitive advantage and differentiator in an exceedingly crowded market.

Figure 5A:
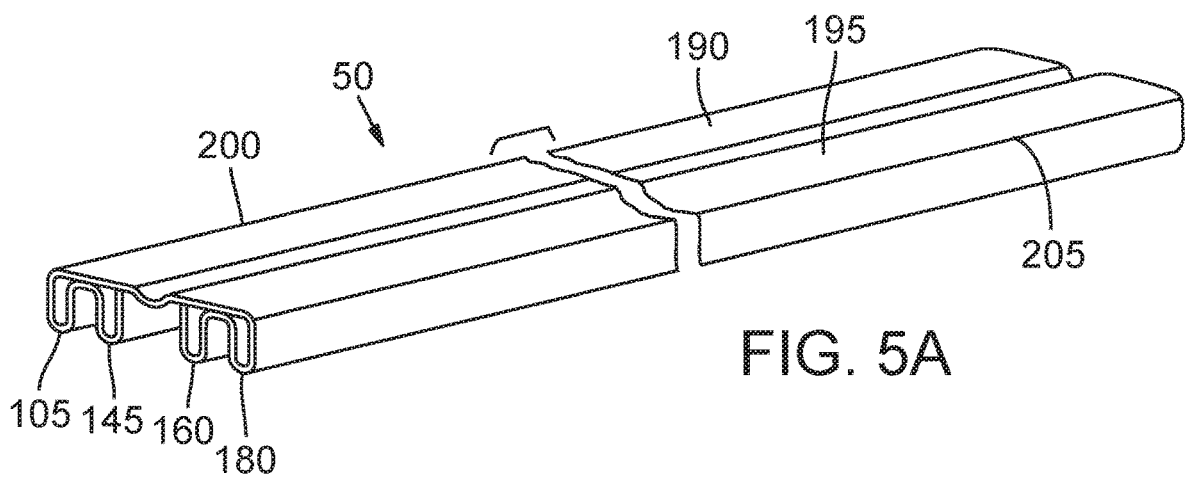
FIG. 5A illustrates a front right isometric view of an elongate body of the fork assembly shown in FIG. 3A.
Figure 5B:
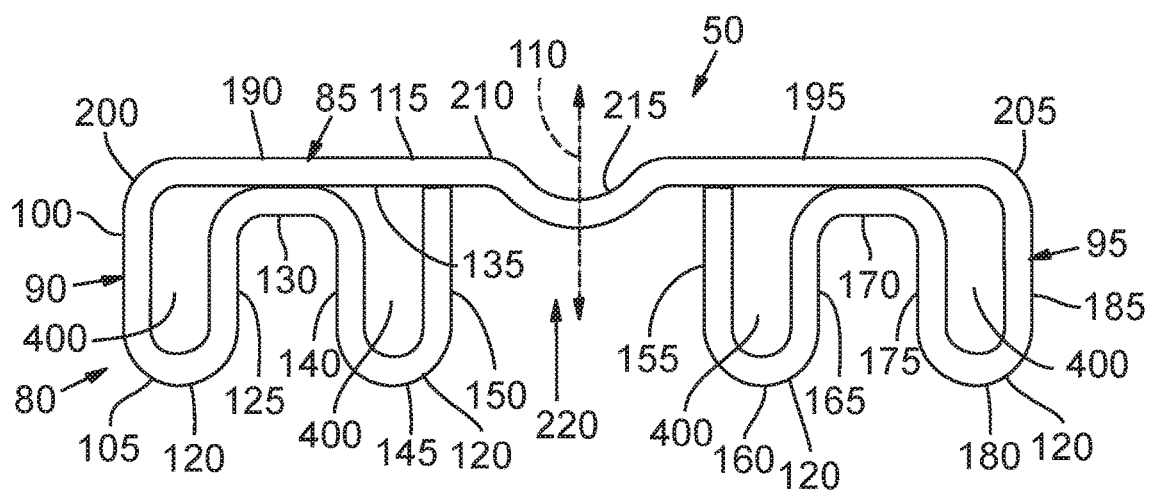
FIG. 5B illustrates a cross-sectional view of the elongate body shown in FIG. 5A.

FIG. 5A and FIG. 5B (collectively FIG. 5) illustrate a front right isometric view and a cross-sectional view, respectively, of an example of an elongate body 50 of a fork assembly 30. With reference to FIG. 5, the elongate body 50 may include an exemplary understructure 80 coupled to a load-bearing upper structure 85, which may form an upper surface 115 of the elongate body 50. The understructure 80 forms a structural element that resists one or more of flex, torsion, axial compression, and/or lateral deflection of the load-bearing upper structure 85. The understructure 80 may include a first truss 90 and a second truss 95. The first truss 90 may include a first strut 100 that extends downward from the outer edge of the load-bearing upper structure 85 in a generally orthogonal orientation with respect to the load-bearing upper structure 85. A first cross beam 105 is coupled to the first strut 100 and extends away from the first strut 100, for example, substantially orthogonally from the first strut 100 (toward a longitudinal midline 110 of the elongate body 50) to form a lower surface 120 of the elongated body 50. A second strut 125 may be coupled to the first cross beam 105 and may extend from the first cross beam 105 toward the load-bearing upper structure 85.

A second cross beam 130 may be coupled to the second strut 125 and may contact the lower surface 135 of the load-bearing upper structure 85. The second cross beam 130 may be optionally coupled to the load-bearing upper structure 85, for example, via spot welds or by being integrally formed with the load-bearing upper structure 85. A third strut 140 is coupled to the second cross beam 130 and extends from the second cross beam 130 away from the load-bearing upper structure 85. A third cross beam 145 is coupled to the third strut 140 and extends away from the third strut 140 (toward the midline 110 of the elongate body 50) to form another lower surface 120 of the elongate body 50. A fourth strut 150 extends from the third cross beam 145 towards the load-bearing upper structure 85 and may be coupled to the load-bearing upper structure 85.

The second truss 95 comprises a fifth strut 155 that extends downward from the load-bearing upper structure 85 and may be coupled to the load-bearing upper structure 85. A fourth cross beam 160 is coupled to the fifth strut 155 and extends away from the fifth strut 155, for example, substantially orthogonally from the fifth strut 204 (away from the longitudinal midline 110 of the elongate body 50) to form another lower surface 120 of the elongated body 50. A sixth strut 165 is coupled to the fourth cross beam 160 and extends from the fourth cross beam 165 towards the load-bearing upper structure 85.

A fifth cross beam 170 is coupled to the sixth strut 165 and contacts the lower surface 135 of the load-bearing upper structure 85. The fifth cross beam 170 is optionally coupled to the load-bearing upper structure 85, for example, via spot welds or by being integrally formed with the load-bearing upper structure 85. A seventh strut 175 is coupled to the fifth cross beam 170 and extends from the fifth cross beam 170 away from the load-bearing upper structure 85. A sixth cross beam 180 is coupled to the seventh strut 175 and extends away from the seventh strut 175 (away from the midline 110 of the elongate body 150) to form another lower surface 120 of the elongate body 50. An eighth strut 185 extends from the sixth cross beam 180 towards the load-bearing upper structure 85 and may be coupled to the load-bearing upper structure 85. The struts may be generally vertical, or one or more of the struts may be angled with respect to the plane(s) of first and second surface zones 190 and 195 of the load-bearing upper structure 85.

The load-bearing upper structure 85 and/or its upper surface 115 may include first and second surface zones 190 and 195 that may be positioned at least partly over the respective first and second trusses 90 and 95 of the understructure 80. The first and second surface zones 190 and 195 may, but need not, have identical dimensions, such as identical lengths and widths. The first and second surface zones 190 and 195 may comprise continuous flat surfaces that form part of the upper surface 115, or they may include features such as longitudinal grooves. Additionally, the first and second surface zones 190 and 195 may be coplanar or they may slope downward from their respective longitudinal edges 200 and 205 toward the midline 110. Also, the first and second surface zones 190 and 195 may be separated by a bridge 210 that spans at least a portion of the distance between the first and second trusses 90 and 95 of the understructure 80. The bridge 210 may also be coplanar with the first and second surface zones 190 and 195 or may include a stiffener or other feature such as a flute or medial furrow 215. The load-bearing upper structure 85 may be bilaterally symmetrical.

The understructure 80 may also be, but need not be, bilaterally symmetrical. The components of the first and second trusses 90 of the understructure 80 may form multiple U-bends. For example, in the embodiment depicted in FIG. 5, the first strut 100, the first cross beam 105, and the second strut 125 may form a U-bend; the third strut 140, the third cross beam 145, and the fourth strut 150 may form a U-bend; the fifth strut 155, the fourth cross beam 160, and the sixth strut 165 may form a U-bend; and the seventh strut 175, the sixth cross beam 180, and the eighth strut 185 may form a U-bend. These U-bends may have similar or different sizes. Additionally, the second strut 125, the second cross beam 130, and the third strut 140 may form an inverted U-bend; and the sixth strut 165, the fifth cross beam 170, and the seventh strut 175 may form an inverted U-bend. The inverted U-bends may have similar or different sizes with respect to each other or with respect to the non-inverted U-bends. One will appreciate that while the embodiment shown in FIG. 5 exhibits rounded edges (such as the edges of the U-bends or the edges of the load-bearing upper structure) that may facilitate rolling or extrusions process, these edges may be manufactured to form substantially transverse angles that may, or may not, be perpendicular.

One or more of the U-bends, the central space 220 under the bridge 210, or other features of the substructure 80 may form longitudinal channels to provide passage for a hydraulic line (not shown) that conveys hydraulic power from a hydraulic power source (not shown).

Figure 6A:
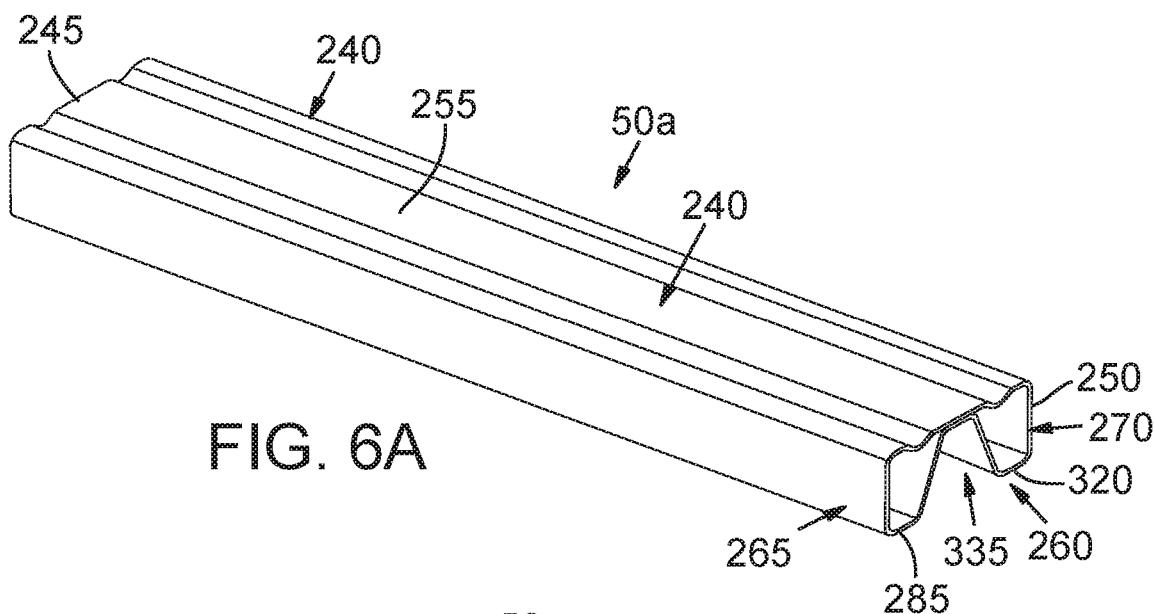
FIG. 6A illustrates a front left isometric view of an elongate body, according to an alternative embodiment.
Figure 6B:
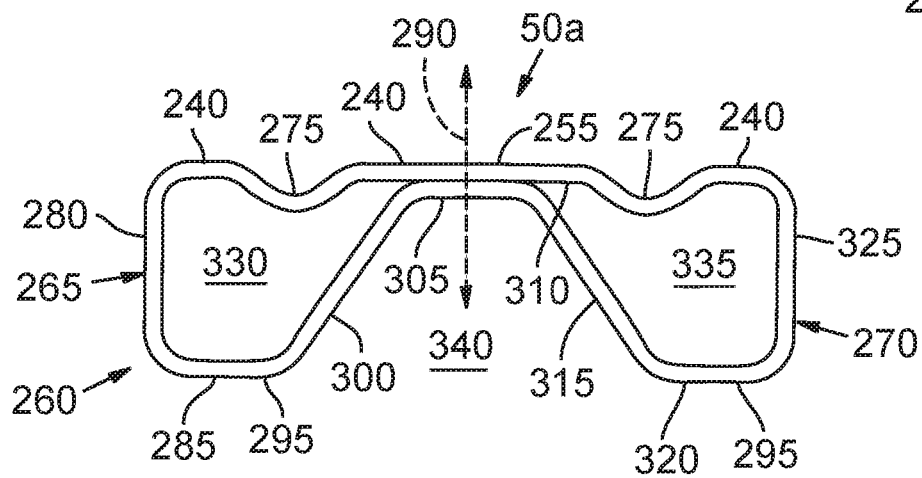
FIG. 6B illustrates a cross-sectional view of the elongate body shown in FIG. 6A.
Figure 6C:
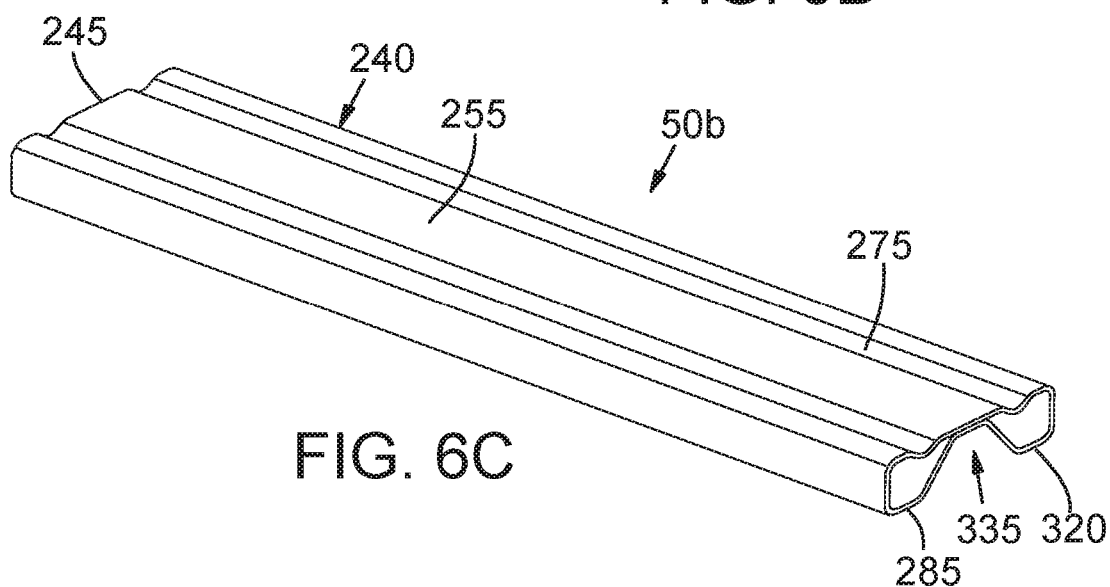
FIG. 6C illustrates a front left isometric view of an elongate body, according to another alternative embodiment.

FIGS. 6A and 6B (collectively FIG. 6) illustrate a front left isometric view and a cross-sectional view, respectively, of an elongate body 50a, according to an alternative embodiment; and FIG. 6C illustrates a front left isometric view of an elongate body 50b, according to another alternative embodiment. With reference to FIG. 6, the functions of the elongate body 50a and the elongate body 50b (collectively elongate body 50) are the same; however, their cross-sectional profiles are different. The elongate body 50a includes a load-bearing upper structure 240 extending longitudinally from a first end 245 to a second end 250. The load-bearing upper structure 240 comprises one or more surface zones 255, such as flat surfaces, and is coupled to a substructure 260 that may include a first truss 265 and a second truss 270 as discussed below. In some embodiments, the surface zone(s) 255 may be rigidly connected to one or more stiffeners 275, such as flutes. Stiffeners may be integrally formed with the surface zone(s) 255 to accomplish a rigid connection or may be welded or otherwise suitably secured to the flat surfaces. Stiffeners 275 may provide resistance against longitudinal bending of the flat surfaces, such as the surface zones 255. Alternate stiffeners include inverted flutes, fins 350 (see, e.g., FIG. 7), and other suitable structures that inhibit longitudinal bending of the flat surfaces. Stiffeners may protrude above the flat surfaces or may protrude below the flat surfaces.

The substructure 260 forms a structural element that resists one or more of flex, torsion, axial compression, and/or lateral deflection of the load-bearing upper structure 240. The first truss 265 includes a first strut 280 that extends downward from the outer edge of the load-bearing upper structure 240 in a generally orthogonal orientation with respect to the load-bearing upper structure 240. A first cross beam 285 is coupled to the first strut 280 and extends away from the first strut 280, for example, substantially orthogonally from the first strut 280 (toward the midline 290 of the elongate body 50) to form a lower surface 295 of the elongate body 50. A second strut 300 is coupled to the first cross beam 285 and extends from the first cross beam 285 towards the load-bearing upper structure 240. The second strut 300 may be non-perpendicular (e.g., positioned in a diagonal plane) with respect to the load-bearing upper structure 240 to enhance the stiffness and torsion-resistance of the elongate body 50.

A second cross beam 305 is coupled to the second strut 300 and may contact a lower surface 310 of the load-bearing upper structure 240. The second cross beam 305 can be coupled to the load-bearing upper structure 240, for example, via spot welds or by being integrally formed with the load-bearing upper structure 240. A third strut 315 is coupled to the second cross beam 305 and extends from the second cross beam 305 away from the load-bearing upper structure 240. The third strut 315 may be non-perpendicular (e.g., positioned in a diagonal plane) with respect to the load-bearing upper structure 240 to enhance the stiffness and torsion-resistance of the elongate body 50. A third cross beam 320 is coupled to the third strut 315 and extends away from the third strut 315 (away from the midline 290 of the elongate body 50) to form another lower surface 295 of the elongate body 50. A fourth strut 325 extends from the third cross beam 94 towards the load-bearing upper structure 240 and is coupled to the other outer edge of the load-bearing upper structure 240.

In some embodiments, the substructure 260 may be coupled to the load-bearing upper structure 240 via welding. The substructure 260 may be integrally formed with the load-bearing upper structure 240. Alternatively, the substructure 260 may be partially integrally formed with the load-bearing upper structure 240 and secured to the load-bearing upper structure 240 via welding or other suitable attachment. Likewise, elements of the substructure 260 may be integrally formed together, may be welded or otherwise suitably attached together, or may be coupled via a combination of integral formation and attachment such as welding.

The second cross beam 305 may be substantially parallel to the load-bearing upper structure 240, may contact and/or be secured to or formed as part of the lower surface 310 of the load-bearing upper structure 240, and may act as a second load-bearing member. Coupling the second cross beam 305 and the load-bearing upper structure 240 to one another, or forming them together, may reduce sliding between them when they are placed under load.

The load-bearing upper structure 240 and the first strut 280, the first cross beam 285, and the second strut 300 of the first truss 265 may form a side channel 330. The load-bearing upper structure 240 and the third strut 315, the third cross beam 320, and the fourth strut 325 of the second truss 270 may form a side channel 335. The first truss 265 and the second truss 270 are spaced apart to form a central channel 340 within the substructure 260 of the fork assembly 30. These channels may provide passage for a hydraulic line (not shown) that conveys hydraulic power from a hydraulic power source (not shown).

With reference to FIG. 6C, the functions of the elongate body 50b and the elongate body 50a (collectively elongate body 50) are the same; however, their cross-sectional profiles are different. The elongate body 50b of FIG. 6C is a squatter variation of the elongate body 50a shown in FIG. 6A. Accordingly, FIGS. 6A and 6C share many of the same reference numerals.

Figure 7:
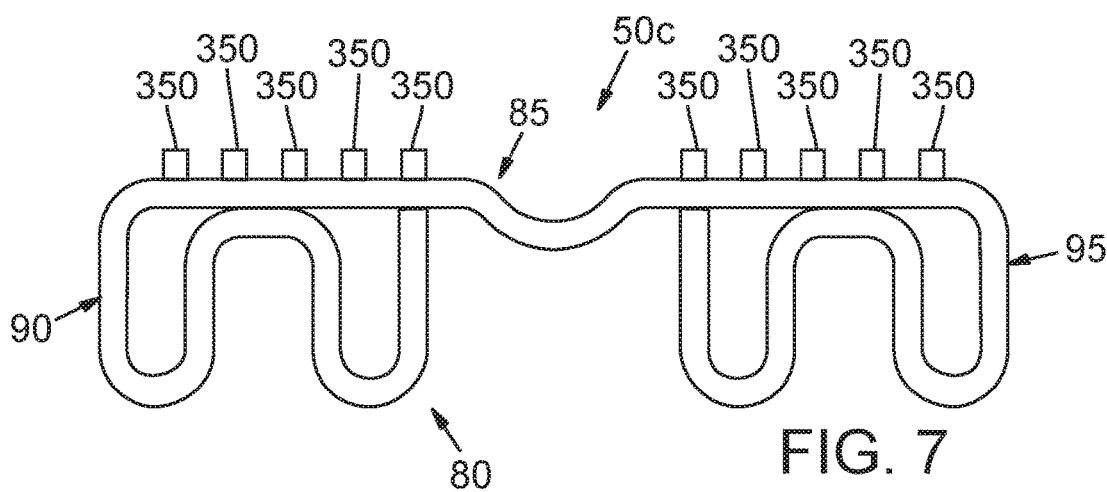
FIG. 7 illustrates a cross-sectional view of an elongate body portion, according to another alternative embodiment.

FIG. 7 illustrates a cross-sectional view of another alternative elongate body 50c. With reference to FIG. 7, the elongate body 50c and the elongate body 50 (collectively elongate body 50) are substantially identical with the exception of the stiffener fins 350. The plurality of the fins 350 may serve to form the upper-most surface of the load-bearing upper structure 85, and may support a load, such as a pallet, thereupon.

FIGS. 8A, 8B, and 8C (collectively FIG. 8) illustrate a front right bottom isometric view, a top front right isometric view, and a top front right enlarged isometric view of portions of the elongate body 50 of the modular fork assembly 30, wherein the elongate body 50 is attached to an embodiment of endcaps 360 that form part of a first interlocking mechanism 365 (FIG. 4) that is configured for detachable connection of the elongate body 50 to the load wheel module 55. With reference to FIGS. 3, 4, and 8, the endcaps 360 may be configured for welding or other means of permanent or nonpermanent attachment to the proximal and/or distal ends 40 and 70 of the elongate body 50. In one example, the endcap 360 may have an endcap body 385 (FIG. 4D) between an external side 370 and an internal side 375 (FIG. 4E) with respect to how the endcap 360 is positioned on the end of the elongate body 50, such that the internal side 375 is closest to the elongate body 50 and the external side 370 is farthest from the elongate body 50 and exposed outwardly when the endcap 360 is connected to the elongate body 50.

The endcap 360 may include a beveled edge 390 between a side surface 395 and the internal side 375. The beveled edge 390 may facilitate a snug fit between the endcap 360 and the proximal end 40 and/or distal end 70 of the elongate body 50. The beveled edge 390 may also provide adequate space or surface area to accommodate a superior weld between the endcap 360 and the elongate body 50.

The endcap 360 may include one or more external flanges 380 that extend from the internal side 375 and are configured to slide into one or more of the externally open channels formed in the understructure 80 and/or in the load-bearing upper structure 85. When welding is the desired means of permanent attachment, the flanges 380 may be configured to contact, and/or conform to the shape of, one or more exposed surfaces of the externally open channels, such as the exposed surfaces of the cross beams 130 and 170 or the lower surface 135 beneath the bridge 210.

The endcap 360 may also include one or more prongs (not shown) that extend from the internal side 375 and are configured to slide into one or more of the closed channels formed by the understructure 80 and/or formed by a combination of portions of the understructure 80 and the load-bearing upper structure 85, such as closed channels 400. The prongs may be configured to contact, and/or generally conform to the shape of, one or more of the surfaces of the closed channels 400, such as the interior surfaces of the struts 100, 125, 140, 165, and 175, such as the interior or exterior surfaces of struts 150 and 155, and/or such as the lower surface 135 within the channels 400. Each prong may include one or more tabs or bumps that are configured to mate with crimps or indentations within the interior surfaces of the channels 400 and may serve to hold or secure the endcaps 360 in place while they are welded or more permanently attached by other means to the elongate bodies 50.

The endcaps 360 may form part of the first interlocking mechanism and may include interlocking features that mate with interlocking features of alternative endcaps (not shown) or interlocking features configured into the body-facing end 65 of the load wheel module 55. One example of interlocking features includes one or more sheer-resistant features, such as protruding features 415 and respective mating receiving features 420 (FIG. 4F). In particular, one of the protruding feature 415 or the receiving feature 420 may be configured to permanently connect to the elongate body (or the endcap 360), and a different one of the protruding feature 415 or the receiving feature 420 may be configured to permanently connect to the load wheel module 55 (or an alternative endcap if one is employed for the load wheel module 55).

In one example, the protruding features 415 may protrude from an external face 425 of the external side 370 of the endcap 360 and may have any shape that is adequate for engagement with respective receiving features 420 configured in alternative endcaps or the interlocking features in the body-facing end 65 of the load wheel module 55. In particular, the protruding features 415 may have a sectional profile of any geometric shape. For example, the sectional profile of the protruding features 415 may be circular as shown in FIG. 8, or the sectional profile may be another shape such as elliptical, rectangular, square, triangular, hexagonal, or octagonal.

The protruding features 415 may have any width or diameter that is typically smaller than dimensions of the external face 425 of the external side 370 (such that the protruding features 415 does not extend above the load-bearing upper structure 85). A typical minimum width of a protruding feature 415 might be about 25 mm. The protruding features 415 may have any protruding height beyond the external face 425 of the external side 370 of the endcap 360 to the extent that the mated receiving feature 420 would not interfere with operation of the load wheel module 55. A typical minimum protruding height might be about 8 mm.

Similarly, the receiving features 420 may have a sectional profile of any geometric shape. For example, the sectional profile of the receiving features 420 may be circular as shown in FIG. 4F, or the sectional profile may be elliptical, rectangular, square, triangular, hexagonal, or octagonal. Moreover, the receiving features 420 may have any width or diameter that is typically smaller than dimensions of the external face 425 of the external side 370. A typical minimum width of a receiving feature 420 might be about 25 mm. The receiving features 420 may have any depth into the mated interlocking feature to the extent that the mated receiving feature 420 would not interfere with operation of the load wheel module 55. A typical minimum depth of receiving feature 420 might be about 8 mm.

Although FIG. 8 depicts only two mated sets of protruding and receiving features 415 and 420, additional sets, or only one, may be employed. For example, a set could additionally or alternatively be employed in proximity to one or more of the corners 435 of the external face 425 (and respective face 450) of the body-facing end 65 of the load wheel module 55. One will also appreciate that the endcap 360 may employ one or more of the receiving features 420 instead of the protruding features 415. Alternatively, the endcap 360 may employ a mix of one or more of the receiving features 420 and one or more of the protruding features 415. The mated endcaps or the interlocking features configured into the body-facing end 65 of the load wheel module 55 would be configured accordingly to mate with the alternative configurations.

With reference again to FIG. 4A, the first interlocking mechanism 365 may additionally or alternatively employ one or more fastener sets, such as male and female mated fasteners. Any suitable mated fastener set can be employed, such as threaded fasteners, unthreaded fasteners, or compression fasteners. The embodiment shown in FIG. 4 employs externally threaded fasteners 460 that are mated to one or more respective internally threaded receptacles 465. The externally threaded fasteners 460 may include a head 470, a shank 475, a thread 480, and a tip 485. The internally threaded receptacles 465 may include a head side 490, which is closest to the head 470 when the externally threaded fastener 460 is mated to the internally threaded receptacle 465, and a tip side 495, which is closest to the tip 485 when the externally threaded fastener 460 is mated to the internally threaded receptacle 465.

An example of externally threaded fasteners 460 includes 16-mm flange-head cap screws or bolts. One will appreciate that the diameter can be of any suitable size. However, a diameter large enough to aid in resistance to sheer between the detachably connected parts might be beneficial. In some embodiments, the externally threaded receptacles 465 have a minimum shank diameter of about 12 mm.

In the depicted embodiment, the endcap 360 includes multiple ones of the same set of fasteners in the same respective engagement arrangements, such that all of the internally threaded receptacles 465 are configured with their head sides 490 closest to the external face 425 of the endcap 360. However, one will appreciate that the endcap 360 could include one or more internally threaded receptacles 465 configured with their head sides 490 closest to the external face 425 and one or more internally threaded receptacles 465 configured with their tip sides 495 (hidden within the flange 480 in connection with the interlocking mechanism 360 but shown in FIG. 3D in connection with a second interlocking mechanism 675) closest to the face 425. Alternatively or additionally, the endcap 360 may be configured to include one or more different types of sets of mated fasteners. In the embodiment shown in FIG. 4E, the tip side 495 is entirely hidden within the flange 480, but the internally threaded receptacles 465 could be configured so that they form a tunnel all the way through the flanges 480.

In the example shown in FIG. 4, the sheer-resistant features are configured to incorporate one internally threaded receptacles 465. In particular, the protruding features 415 and the receiving features 420 each have holes to receive the externally threaded fastener 460. When threaded fasteners are employed, at least the protruding feature 415 or the receiving feature 420 that is intended to be closest to the tip 485 may be internally threaded (if a separate nut, for example, is not employed). In the embodiment shown, the protruding features 415 of the endcap 360 include the internally threaded receptacles 465 because the welding flanges 380 could be in the way of placing a nut or tightening the fastener head 470. One will appreciate that the design of the elongate body 50 or the endcap 360 can be modified to accommodate placement of the head 470 of the externally threaded fastener 460, in which circumstances the sheer-resistant feature, such as the receiving feature 420 in the body-facing end 65 of the load wheel module 55 could be configured to incorporate the internally threaded receptacles 465. However, if the fastener head 470 is to be closest to the body-facing end 65 of the load wheel module 55, then the shank holes 500 of the receiving feature 420 in the body-facing end 65 of the load wheel module 55 can be threaded or unthreaded.

Figure 9C:
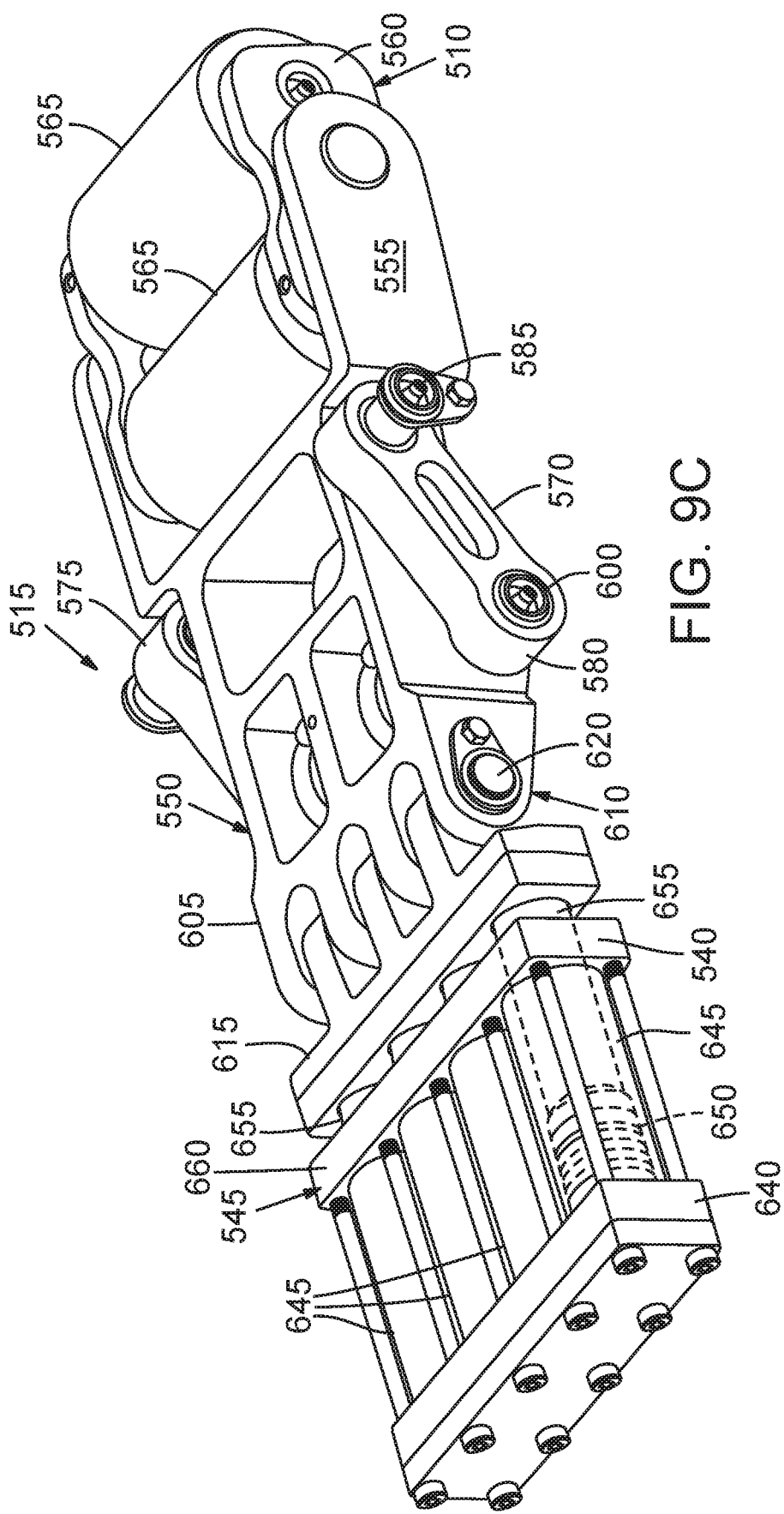
FIG. 9C illustrates a front right top isometric view of a wheel module substructure of a load wheel module, according to one embodiment.

FIG. 9A illustrates a front right bottom isometric view of a load wheel module 55 with a load wheel unit 510 in an undeployed position 440; FIG. 9B illustrates a front right bottom isometric view of the load wheel module 55 with a load wheel unit 510 in a deployed position 445; and FIG. 9C illustrates a front right top isometric view of a wheel module substructure 515. With reference to FIGS. 9A, 9B, and 9C (collectively FIG. 9), and additionally FIGS. 3 and 4, the load wheel module 55 includes a frame 520 that houses the wheel module substructure 515. The frame 520 includes a frame upper surface 525 and a frame lower surface 530. The frame upper surface 525 may be configured to support and provide sliding contact to a load, and the frame lower surface 530 may be configured to provide one or more points of contact with components of the wheel module substructure 515.

The frame 520 may have a body-facing end 65 and a fork tip-facing end 75 that may be substantially identical in shape or that may be different. For example, both of the body-facing end 65 and the fork tip-facing end 75 may be configured to include substantially identical interlocking mechanism components. In particular, the sheer-resistant features, such as the protruding features 415 or the receiving features 420 may be identically positioned on both of the body-facing end 65 and the fork tip-facing end 75. The wheel module assembly 55 depicted in FIG. 9 includes receiving features 420a configured into its fork tip-facing end 75. One will appreciate, however, that the body-facing end 65 and the fork tip-facing end 75 may have different types of sheer-resistant features in the same or different locations on each of the facing ends of the frame 520.

The frame 520 may also include an aperture 535 in both of the body-facing end 65 and the fork tip-facing end 75 if symmetry is desired for manufacturing. However, in some embodiments, only the body-facing end 65 of the frame 520 may include the aperture 535 to provide passage for a hydraulic line (not shown) that conveys hydraulic power from a hydraulic power source (not shown) to a hydraulic actuator 540 in the load wheel module 55. In other embodiments, the aperture 535 may provide passage for a mechanical link arm to facilitate lowering and raising a load wheel 565 via a suitable mechanical system coupled to the load wheel module 55, where the mechanical link arm receives a motive force from a power source located in a forklift truck body.

The wheel module substructure 515 may include a hydraulic actuator assembly 545 and a load wheel assembly 550 that is operatively connected to the frame 520. The load wheel assembly 550 includes a wheel carrier strut 555 (also called a wheel carrier frame) that is operatively connected to, and supports, the load wheel unit 510 that includes a wheel carrier 560 that supports one or more load wheels 565. In one example, the wheel carrier strut 555 has a U-shaped distal portion that is pivotally connected to the wheel carrier 560 on both sides of the load wheels 560.

The wheel module substructure 515 may be positioned within the frame 520 such that the hydraulic actuator assembly 545 is positioned closer to the body-facing end 65 of the load wheel module 55 and the load wheel assembly 550 is positioned closer to the fork tip-facing end 75 of the load wheel module 55. In particular, the hydraulic actuator 540 may be positioned closer to the body-facing end 65 and the load wheels 565 may be positioned closer to the fork tip-facing end 75.

The wheel carrier strut 555 is also operatively connected to the load wheel module frame 520 and to the hydraulic actuator assembly 545. In one example, the operative connection to the frame 520 may be implemented by one or more pivot bars 570 that may be pivotally connected at a bar frame end 575 to the frame 520 and at a bar strut end 580 to the wheel carrier strut 555. Part of a pivot mechanism 585 at the bar frame end 575 may be secured within a recess 590 in an exterior side surface 595 of the frame 520 so that the part of the pivot mechanism 585 will not catch when the modular fork assemblies 30 are slid into load structures that support the load. One will appreciate that other pivot mechanisms can additionally or alternatively be counter sunk into the components that they are pivoting. For example, although not depicted in this manner, part of the pivot mechanism 600 at the bar strut end 580 may be recessed into the pivot bar 570.

An actuator-facing end 605 of the wheel carrier strut 555 may be operatively connected to the hydraulic actuator assembly 545 via a pivot mechanism 610 at a strut-facing end 615 of the hydraulic actuator assembly 545. The pivot mechanism 610 may include a pivot 620 that extends through one or more strut teeth 625 at the actuator-facing end 605 of the wheel carrier strut 555 that are interweaved with one or more actuator assembly teeth 630 at the strut-facing end of the hydraulic actuator assembly 545.

The hydraulic actuator assembly 545 may include a hydraulic line input connector (also called a cap-end port) (not shown) operative for connecting the hydraulic actuator 540 to a hydraulic line (not shown) that transmits hydraulic fluid from a hydraulic power source (not shown). The hydraulic line input connector may supply a hydraulic manifold 640 that distributes hydraulic power from the hydraulic line into multiple hydraulic barrels (also called hydraulic cylinders) 645 that each include a piston 650 (shown in broken lines in FIG. 9C) that is operatively connected to a piston rod 655.

In some embodiments, the hydraulic actuator 540 may include from one to ten pistons 650. In some embodiments, the hydraulic actuator 540 includes at least two pistons 650. In some embodiments, the hydraulic actuator 540 may include from two to ten pistons 650. In some embodiments, the hydraulic actuator 540 includes at least three pistons 650. In some embodiments, the hydraulic actuator 540 may include from three to eight pistons 650. In some embodiments, the hydraulic actuator 540 may include from three to six pistons 650. FIG. 9C shows an example of a hydraulic actuator 540 that includes four hydraulic barrels 645, each of which includes a respective piston 650.

In one example, the piston 650 may have has a length within the range of about 0.50 inches to about 3 inches (or about 1.25 cm to about 7.75 cm) and a stroke length within the range of about 1 inch to about 3 inches (or about 2.50 cm to about 7.75 cm). In another example, the piston 650 may have a length within the range of about 1 inch to about 2 inches (or about 2.50 cm to about 5.25 cm) and a stroke length within the range of about 1.5 inches to about 2.5 inches (or about 3.75 cm to about 6.50 cm).

In one example, the hydraulic barrels 645 have a capability up to about 3,200 psi. In some embodiments, the hydraulic barrels 645 have a capability of greater than about 2,000 psi. In some embodiments, the hydraulic barrels 645 have a capability of greater than about 3,000 psi. In some embodiments, the hydraulic power from the hydraulic power source has a maximum pressure within the range of about 13,790 to about 27,580 kilopascals (about 2000 to about 4000 psi) at the hydraulic line input connector.

In some embodiments, the hydraulic actuator 540 is operable to provide maximum thrust within a range of about 15,000 pounds (or about 66,700 newtons) to about 30,000 pounds (or about 133,500 newtons). In some embodiments, the hydraulic actuator 540 is operable to provide greater than about 15,000 pounds (or greater than about 66,750 newtons) of thrust. In some embodiments, the hydraulic actuator 540 is operable to provide greater than about 20,000 pounds (or greater than about 89,000 newtons) of thrust.

The load wheel unit 510 may rest in an undeployed position 440 when the hydraulic actuator 540 is not actively pushing the piston rods 655 beyond a cylinder head 660 of the piston assembly. The load wheel unit 510 may be deployed into a deployed position 445 in response to a load wheel deployment signal that may be provided by an automated system or may be provided in response to a manually activated input, such as a switch or button. The load wheel deployment signal directly or indirectly causes hydraulic power to be propagated through a hydraulic line positioned within the elongate body 50 of the modular fork assembly 30. The hydraulic power may be in the form of a hydraulic fluid under pressure.

The hydraulic line delivers the hydraulic power through the hydraulic line input connector to the hydraulic manifold 640 that distributes the hydraulic power to the hydraulic barrels 645 of the hydraulic actuator 540. The hydraulic power pushes the pistons 650 of the hydraulic actuator 540 so that the piston rods 655 extend beyond the cylinder head 660 to push against the actuator-facing end 605 of the wheel carrier strut 555, causing the pivot bar 570 to force the load wheel unit 510 to assume a predetermined deployed position 445 in which the load wheel unit 510 is vertically spaced apart from the load wheel module frame 520. One will appreciate that the hydraulic line and hydraulic actuator assembly 545 can be replaced by a link rod that is actuated close to the proximal end 40 of the elongate body 50 and a mechanical system coupled to the load wheel module 55 and arranged to lower and raise the load wheel 565 in response to movement of the link rod. For example, a suitable mechanical system may be coupled to a load wheel module 55 with a link rod extending through an elongate body 50 of a fork assembly 30 to mechanically connect the mechanical system with a power source such that force from the power source is transmitted via the link rod to the mechanical system to lower and raise the load wheel 565.

With reference again to FIGS. 3 and 4, a second interlocking mechanism 675 can be configured to detachably connect the load wheel module 55 to the fork tip 60 or an endcap 670. The fork-tip facing end 75 of the load wheel module 55 can be configured to mate with the proximal end 665 of the fork tip 60 or the endcap 670. The endcap 670 may form part of the second interlocking mechanism 675. The endcap 670 may be substantially identical to, or different from, the endcap 360. Moreover, the second interlocking mechanism 675 may be substantially identical to, or different from, the first interlocking mechanism 365. In the embodiment shown in FIG. 3D, the internally threaded receptacle 465 may be configured as a ferrule 685 that protrudes from the internal side of the endcap 670. The tip side 495 of the internally threaded receptacle 465 may be open or closed.

All the alternatives described with respect to the first interlocking mechanism 365 may apply to the second interlocking mechanism 675. In one alternative embodiment, the fork-tip facing end 75 of the load wheel module 55 may be provided with the sheer-resistant protruding features 415, and the endcap 670 or the proximal end 665 of the fork tip 60 may be provided with the sheer-resistant receiving features 420.

The fork tip 60 has a distal end (also referred to as the toe end) 680 that is opposite the proximal end 665, i.e., the distal end 680 is furthest from the battery box 35. The distal end 680 of the fork tip 60 initially engages a pallet when the modular fork assembly 30 is directed to pick up a load. The fork tip 60 may taper in one or more dimensions from the proximal end 665 to the distal end 680 so that the perimeter of the distal end 680 is smaller than the perimeter of the proximal end 665. In one example, the fork tip 60 and/or the distal end 680 has a wedged shape. In another example, the distal end 680 has a curved shape.

A major advantage of the modularity of the modular fork assembly 30 is that any one of the modular components, such as the elongate body 50, the load wheel module 55, or the fork tip 60, can be readily replaced if they become bent or otherwise damaged. Such replacement can be achieved without metal cutting or welding. In some embodiments, only a simple tool such as a screwdriver or wrench may be utilized to effect the replacement. Moreover, these modular fork assemblies 30 and their components may be readily salvaged from a disabled vehicle and reused in a working vehicle or as replacement parts.

While some of the examples have been illustrated or described with respect to providing functionality for a "walkie" or "rider" style pallet truck, some or all of the features may also be enabled for operation with other types of industrial vehicles including, but not limited to, reach trucks, three-wheel stand trucks, warehouse trucks, and counterbalanced trucks.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A fork assembly for a forked material-handling vehicle, the fork assembly comprising:
   a discrete elongate body;
   a discrete load wheel module configured for movement of one or more load wheels between an undeployed position and a deployed position;
   a first interlocking mechanism detachably connecting the elongate body to the load wheel module;

a discrete fork tip; and a second interlocking mechanism detachably connecting the load wheel module to the fork tip, wherein the first interlocking mechanism and the second interlocking mechanism are substantially identical, wherein the interlocking mechanisms employ mated shear-resistant features including a protruding feature that is mated to a receiving feature, wherein the protruding feature protrudes from an external face of an external side of an endcap associated with the elongate body, the load wheel module, or the fork tip.

2. The fork assembly according to claim 1, wherein the first interlocking mechanism and the second interlocking mechanism are interchangeable.

3. The fork assembly according to claim 1, wherein the first interlocking mechanism and the second interlocking mechanism contain an interchangeable component.

4. The fork assembly according to claim 1, wherein at least one of the first interlocking mechanism and the second interlocking mechanism employs mated shear-resistant features, including first and second sheer-resistant features.

5. The fork assembly according to claim 4, wherein the sheer-resistant features are configured to receive a fastener.

6. The fork assembly according to claim 1, wherein at least one of the first interlocking mechanism and the second interlocking mechanism employs a mated internally threaded receptacle and an externally threaded fastener.

7. The fork assembly according to claim 1, wherein the first interlocking mechanism employs a first internally threaded receptacle that is mated to a first externally threaded fastener, wherein one of the first internally threaded receptacle and the first externally threaded fastener is configured to connect to the elongate body, and wherein a different one of the first internally threaded receptacle and the first externally threaded fastener is configured to connect to the load wheel module.

8. The fork assembly according to claim 1, wherein the first interlocking mechanism includes a first protruding feature that is mated to a first receiving feature, wherein one of the first protruding feature and the first receiving feature is permanently connected to the elongate body, wherein a different one of the first protruding feature and the first receiving feature is permanently connected to the load wheel module.

9. The fork assembly according to claim 8, wherein both of the first protruding feature and the first receiving feature are configured to receive the first externally threaded fastener.

10. The fork assembly according to claim 1, wherein the first interlocking mechanism includes a first endcap that is attached to the elongate body and includes a first sheer-resistant body feature that is mated to a first sheer-resistant module feature of the load wheel module.

11. The fork assembly according to claim 10, wherein the first endcap is welded to the elongate body.

12. The fork assembly according to claim 10, wherein the second interlocking mechanism includes a second endcap that is attached to the fork tip and includes a second sheer-resistant attachment feature that is mated to a second sheer-resistant module feature of the load wheel module, wherein the first and second interlocking mechanisms are operatively identical.

13. The fork assembly according to claim 10, wherein the second interlocking mechanism includes a second endcap that is attached to the fork tip and includes a second sheer-resistant attachment feature that is mated to a second sheer-resistant module feature of the load wheel module.

14. The fork assembly according to claim 13, wherein the second sheer-resistant attachment feature and the second sheer-resistant module feature are adapted to receive a fastener.

15. The fork assembly according to claim 1, wherein the elongate body has a first characterizing color, wherein the load wheel module has a second characterizing color, wherein the fork tip has a third characterizing color, and wherein the first, second, and third characterizing colors are different.

16. The fork assembly according to claim 1, wherein the load wheel module has opposing ends having substantially identical sheer-resistant features.

17. The fork assembly according to claim 1, wherein the elongate body includes a channel along its length, and wherein an endcap associated with the first interlocking mechanism includes an aperture that aligns with the channel.

18. The fork assembly according to claim 1, wherein the fork tip includes a proximal connection end for attachment closest to the load wheel module, wherein the proximal connection end has proximal end dimensions, wherein the tip distal end has distal end dimensions, and wherein at least one of the tip distal end dimensions is smaller than a respective one of the proximal end dimensions.

19. The fork assembly according to claim 1, wherein the load wheel module comprises:
a frame;
a load wheel assembly, including a load wheel, operatively connected to the frame; and
a hydraulic actuator contained within the frame and operatively connected to the load wheel assembly to lower the load wheel hydraulically.

20. The fork assembly according to claim 1, wherein the load wheel module comprises:
a frame;
a load wheel assembly, including a load wheel, operatively connected to the frame; and
a mechanical link operatively coupled to the load wheel assembly to lower the load wheel, wherein the mechanical link extends through the discrete elongate body.

21. The fork assembly according to claim 1, wherein the forked material-handling vehicle comprises a pallet truck.

22. The fork assembly according to claim 1, wherein the load wheel module is positioned between the elongate body and the fork tip.

23. The fork assembly according to claim 1, wherein the elongate body, the load wheel module, and the fork tip comprise upper surfaces that are aligned substantially in the same plane.

24. The fork assembly according to claim 1, wherein the discrete fork tip has a tip distal end that is configured to engage a pallet.

25. The fork assembly according to claim 1, wherein the load wheel module includes a load wheel frame, and wherein the load wheel module employs a pivotal connection between the load wheel frame and the one or more load wheels.

26. The fork assembly according to claim 1, wherein the forked material-handling vehicle is configured to employ two forks having spaced-apart respective unobstructed distinct distal ends.

27. The fork assembly according to claim 1, wherein the load wheel module has a frame, wherein the load wheel module is configured so that the one or more load wheels are at least partly surrounded by the frame in the undeployed position and the one or more load wheels extend completely beyond the frame in the deployed position.

28. A pallet truck including a fork assembly, the pallet truck comprising:
a steer wheel;
a chassis operatively connected to the steer wheel; and
two substantially parallel forks operatively connected to and extending from the chassis and configured to hold a load for conveyance by the pallet truck as the pallet truck moves, the forks including a first fork and a second fork,
wherein the first fork comprises a first elongate body, a first load wheel module, a first interlocking mechanism detachably connecting the first elongate body to the first load wheel module, a first fork tip, and a second interlocking mechanism detachably connecting the first load wheel module to the first fork tip, wherein the first interlocking mechanism and the second interlocking mechanism are substantially identical, and wherein the interlocking mechanisms employ mated shear-resistant features including a protruding feature that is mated to a receiving feature, wherein the protruding feature protrudes from an external face of the external side of an endcap associated with an elongate body, a load wheel module, or a fork tip,
wherein the first load wheel module is configured for movement of one or more first load wheels between an undeployed position and a deployed position,
wherein the second fork comprises a second elongate body, a second load wheel module, a third interlocking mechanism detachably connecting the second elongate body to the second load wheel module, a second fork tip, and a fourth interlocking mechanism detachably connecting the second load wheel module to the second fork tip, and
wherein the second load wheel module is configured for movement of one or more second load wheels between an undeployed position and a deployed position.

29. The pallet truck of claim 28, wherein the first and second load wheel modules are interchangeable, wherein the first and second tips are interchangeable, wherein the first and third interlocking mechanisms are interchangeable, and wherein the second and fourth interlocking mechanisms are interchangeable.

30. The pallet truck of claim 28, further comprising:
a hydraulic power source; and
a first hydraulic line positioned through the first elongate body, wherein the first hydraulic line transmits hydraulic fluid from the hydraulic power source to a first hydraulic actuator positioned completely within the first load wheel module.

31. The pallet truck of claim 28, further comprising:
a power source; and
a first mechanical link positioned through the first elongate body, wherein the first mechanical link is configured to transmit force from the power source to a first load wheel mechanism positioned within the first load wheel module to lower the load wheel.

32. The pallet truck of claim 28, wherein the first and second load wheel modules each comprise:
a frame;
a load wheel assembly, including a load wheel, operatively connected to the frame; and
a hydraulic actuator contained within the frame and operatively connected to the load wheel assembly to lower the load wheel hydraulically.

33. The pallet truck of claim 28, wherein at least one of the first and third interlocking mechanisms includes a first endcap that is attached to the elongate body and includes a first sheer-resistant body feature that is mated to a first sheer-resistant module feature of the load wheel module.

34. The pallet truck of claim 28, wherein at least one of the first and third interlocking mechanisms includes a first protruding feature that is mated to a first receiving feature, wherein one of the first protruding feature and the first receiving feature is permanently connected to the elongate body, wherein a different one of the first protruding feature and the first receiving feature is permanently connected to the load wheel module.

35. The pallet truck of claim 28, wherein the first and second elongate bodies have a first characterizing color, wherein the first and second load wheel modules have a second characterizing color, wherein the first and second fork tips have a third characterizing color, and wherein the first, second, and third characterizing colors are different.

36. The pallet truck of claim 28, wherein the first load wheel module is positioned between the first elongate body and the first fork tip.

37. The pallet truck of to claim 28, wherein the first elongate body, the first load wheel module, and first the fork tip comprise upper surfaces that are aligned substantially in the same plane.

38. The pallet truck according to claim 28, wherein the first fork tip has a first tip distal end that is configured to engage a pallet, and wherein the second fork tip has a second tip distal end that is configured to engage the pallet.

39. The pallet truck according to claim 28, wherein the first load wheel module includes a load wheel frame, and wherein the first load wheel module employs a pivotal connection between the load wheel frame and the one or more load wheels.

40. The pallet truck according to claim 28, wherein the pallet truck is configured to employ two forks having spaced-apart respective unobstructed distinct distal ends.

41. The pallet truck according to claim 28, wherein the load wheel module has a frame, wherein the load wheel module is configured so that the one or more load wheels are at least partly surrounded by the frame in the undeployed position and the one or more load wheels extend completely beyond the frame in the deployed position.

42. A method of assembling a fork for a forked material-handling vehicle, the method comprising:
detachably connecting a first sheer-resistant body feature of a first interlocking mechanism to a first sheer-resistant module feature on a proximal end of a modular load wheel module, wherein the modular load wheel module is configured for movement of one or more load wheels between an undeployed position and a deployed position, wherein the first sheer-resistant body feature forms part of a first end cap that is attached to a distal end of a modular elongate body of the fork, and wherein the first sheer-resistant body feature is mated to the first sheer-resistant body feature; and
detachably connecting a second sheer-resistant module feature at a distal end of the modular load wheel module to a second sheer-resistant attachment feature of second interlocking mechanism at a proximal end or an endcap of a modular fork tip, wherein the second sheer-resistant attachment feature is mated to a second sheer-resistant module feature, wherein the first interlocking mechanism and the second interlocking mechanism are substantially identical, and wherein the interlocking mechanisms employ mated shear-resistant features including a protruding feature that is mated to a receiving feature, wherein the protruding feature protrudes from an external face of the external side of an endcap associated with an elongate body, a load wheel module, or a fork tip.

43. The method of claim 42, comprising:
connecting the modular elongate body to a battery box or chassis of the forked material-handling vehicle.

44. The method of claim 42, comprising:
connecting a hydraulic line through the elongate body to a hydraulic actuator completely within the modular load wheel module.

45. The method of claim 44, wherein the hydraulic line through the elongate body is configured to transmit hydraulic fluid from the hydraulic power source to the hydraulic actuator.

46. The method of claim 42, wherein the modular elongate body is selected from one of multiple modular elongate bodies having substantially identical cross sections, wherein the modular load wheel module is selected from one of multiple interchangeable modular load wheel modules, and wherein the modular fork tip is selected from one of multiple interchangeable modular fork tips.

47. The method of claim 42, wherein the load wheel module is positioned between the elongate body and first fork tip.

48. The method of claim 42, wherein the elongate body, the load wheel module, and the fork tip comprise upper surfaces that are aligned substantially in the same plane.

49. The method of claim 42, wherein the modular fork tip has a tip distal end that is configured to engage a pallet.

50. The method of claim 42, wherein the modular load wheel module includes a load wheel frame, and wherein the modular load wheel module employs a pivotal connection between the load wheel frame and the one or more load wheels.

51. The method of claim 42, wherein the forked material-handling vehicle is configured to employ two forks having spaced-apart respective unobstructed distinct distal ends.

52. The method of claim 42, wherein the load wheel module has a frame, wherein the load wheel module is configured so that the one or more load wheels are at least partly surrounded by the frame in the undeployed position and the one or more load wheels extend completely beyond the frame in the deployed position.

53. An inventory of parts for a fork assembly for a pallet truck, the inventory comprising:
multiple interchangeable elongate bodies;
multiple interchangeable load wheel modules, each load wheel module configured for movement of one or more load wheels between an undeployed position and a deployed position;
multiple interchangeable fork tips, wherein the multiple interchangeable fork tips each have a tip distal end that is configured to engage a pallet; and
multiple operatively identical interlocking mechanism components configured for detachable connection of any one of the elongate bodies to any one of the load wheel modules and configured for detachable connection of any one of the fork tips to any one of the load wheel modules.

54. The inventory of parts of claim 53, wherein each of the load wheel modules include a load wheel frame, and wherein each of the load wheel modules employ a pivotal connection between the load wheel frame and the one or more load wheels.

55. The inventory of parts of claim 53, wherein the load wheel module has a frame, wherein the load wheel module is configured so that the one or more load wheels are at least partly surrounded by the frame in the undeployed position and the one or more load wheels extend completely beyond the frame in the deployed position.

56. The inventory of parts of claim 53, wherein the interlocking mechanisms include a first interlocking mechanism and a second interlocking mechanism that employ mated shear-resistant features, including first and second sheer-resistant features.

57. The inventory of parts of claim 56, wherein the sheer-resistant features are configured to receive a fastener.

58. The inventory of parts of claim 53, wherein the interlocking mechanisms include a first interlocking mechanism and a second interlocking mechanism that employ a mated internally threaded receptacle and an externally threaded fastener.

59. The inventory of parts of claim 53, wherein the interlocking mechanisms include a first protruding feature that is mated to a first receiving feature, wherein one of the first protruding feature and the first receiving feature is permanently connected to the elongate body, wherein a different one of the first protruding feature and the first receiving feature is permanently connected to the load wheel module.

60. An inventory of parts for a fork assembly for a pallet truck, the inventory comprising:
multiple interchangeable elongate bodies;
multiple interchangeable load wheel modules;
multiple interchangeable fork tips; and
multiple operatively identical interlocking mechanism components configured for detachable connection of any one of the elongate bodies to any one of the load wheel modules and configured for detachable connection of any one of the fork tips to any one of the load wheel modules, wherein the interlocking mechanism components employ mated shear-resistant features including a protruding feature that is mated to a receiving feature, wherein the protruding feature protrudes from an external face of the external side of an endcap associated with an elongate body, a load wheel module, or a fork tip.

61. The inventory of parts of claim 60, wherein each of the load wheel modules include a load wheel frame, and wherein each of the load wheel modules employ a pivotal connection between the load wheel frame and the one or more load wheels.

62. The inventory of parts of claim 60, wherein each of the load wheel modules has a frame, wherein each load wheel module is configured so that the one or more load wheels are at least partly surrounded by the frame in the undeployed position and the one or more load wheels extend completely beyond the frame in the deployed position.

63. An inventory of parts for a fork assembly for a pallet truck configured to employ two forks having spaced-apart respective unobstructed distinct distal ends, the inventory comprising:
multiple interchangeable elongate bodies;
multiple interchangeable load wheel modules, each load wheel module configured for movement of one or more load wheels between an undeployed position and a deployed position;
multiple interchangeable fork tips; and
multiple operatively identical interlocking mechanism components configured for detachable connection of any one of the elongate bodies to any one of the load wheel modules and configured for detachable connection of any one of the fork tips to any one of the load wheel modules.

\* \* \* \* \*

UNITED STATES PATENT AND TRADEMARK OFFICE
CERTIFICATE OF CORRECTION

| | | |
|---|---|---|
| PATENT NO. | : 11,365,103 B2 | |
| APPLICATION NO. | : 16/367050 | |
| DATED | : June 21, 2022 | |
| INVENTOR(S) | : Robert Dunigan | |

It is certified that error appears in the above-identified patent and that said Letters Patent is hereby corrected as shown below:

In the Specification

In Column 3, Line 40, delete "associate with" and insert --associated with-- therefor.

In Column 6, Line 61, delete "according one" and insert --according to one-- therefor.

In Column 6, Line 63, delete "according one" and insert --according to one-- therefor.

In the Claims

In Column 24, Claim 37, Line 23, delete "of to" and insert --of-- therefor.

Signed and Sealed this
Third Day of September, 2024

Katherine Kelly Vidal
*Director of the United States Patent and Trademark Office*